(12) United States Patent
Elahmadi et al.

(10) Patent No.: US 7,302,192 B2
(45) Date of Patent: Nov. 27, 2007

(54) METHODS OF SPREAD-PULSE MODULATION AND NONLINEAR TIME DOMAIN EQUALIZATION FOR FIBER OPTIC COMMUNICATION CHANNELS

(75) Inventors: Salam Elahmadi, Dallas, TX (US); Siraj Nour Elahmadi, Dallas, TX (US)

(73) Assignee: Menara Networks, Dallas, TX (US)

( * ) Notice: Subject to any disclaimer, the term of this patent is extended or adjusted under 35 U.S.C. 154(b) by 156 days.

(21) Appl. No.: 11/117,228

(22) Filed: Apr. 28, 2005

(65) Prior Publication Data

US 2006/0245765 A1 Nov. 2, 2006

(51) Int. Cl.
*H04B 10/04* (2006.01)
(52) U.S. Cl. .................. 398/190; 398/77; 398/149
(58) Field of Classification Search .......... 398/98–101, 398/164, 186–191, 77, 149
See application file for complete search history.

(56) References Cited

U.S. PATENT DOCUMENTS

| | | | |
|---|---|---|---|
| 3,385,970 A | 5/1968 | Coffin Jr., et al. |
| 4,070,572 A | 1/1978 | Summerhayes |
| 4,408,307 A | 10/1983 | Harris |
| 4,427,895 A | 1/1984 | Eng |
| 4,584,719 A | 4/1986 | Miller |
| 4,713,841 A | 12/1987 | Porter et al. |
| 4,893,002 A | 1/1990 | Kollanyi |
| 5,060,303 A | 10/1991 | Wilmoth |
| 5,105,293 A | 4/1992 | Bortolini |
| 5,227,646 A | 7/1993 | Shigeno |
| 5,253,096 A | 10/1993 | Freeman et al. |

(Continued)

OTHER PUBLICATIONS

Hecht, Jeff, Understanding Fiber Optics, 1987, pp. 116-146 and 279-280, Hosard W. Sams & Company, Indianapolis, IN, ISBN 0-672-27066-8.
Ashar, Kanu G., Magnetic Disk Drive Technology, Heads, Media, Channel, Interfaces, and Integration, 1997, pp. 214-222IEEE Press, New York, NY. ISBN 0-7803-1083-7, IEEE Order No. PC4374.
Kao, Charles K., Optical Fiber Systems: Technology, Design, and Applications, 1982, 103-117 and 159-183, McGraw-Hill, USA, ISBN 0-07033277-0.pp.
Fiber Optic Technical Manual, 2000, Agilent Technologies, Inc., www.semiconductor.agilent.com, pp. 1-60.

*Primary Examiner*—Dzung Tran
(74) *Attorney, Agent, or Firm*—Blakely Sokoloff Taylor & Zafman, LLP

(57) ABSTRACT

Methods, apparatus, and systems for an optical communication channel. A data signal is preconditioned prior to transmission over a fiber optic cable to minimize signal distortion and transmitted over a fiber optic cable. Preconditioning may include none, one or more, or all of the following: encoding the data signal using a run length limited code, correlating bits of the data signal, and spreading out the pulses in the time-domain in the data signal. The pulse spreading function can be implemented either in the electrical domain prior to the electrical-to-optical conversion; in the optical domain during and/or after the electrical-to-optical conversion; or a combination of both. During reception, the data signal and clock are recovered. Recovery may include maintaining an amplitude in an electrical signal, filtering the electrical signal, shaping the electrical signal, and removing distortions and intersymbol interference (ISI) from the received electrical signal.

30 Claims, 14 Drawing Sheets

U.S. PATENT DOCUMENTS

| | | | |
|---|---|---|---|
| 5,541,960 A * | 7/1996 | Satomura et al. | 375/368 |
| 5,828,476 A | 10/1998 | Bonebright et al. | |
| 5,896,480 A | 4/1999 | Scharf et al. | |
| 6,084,535 A * | 7/2000 | Karabed et al. | 341/58 |
| 6,307,659 B1 | 10/2001 | Gilliland et al. | |
| 6,385,255 B1 * | 5/2002 | McLaughlin et al. | 375/263 |
| 2004/0066856 A1 * | 4/2004 | Forestieri et al. | 375/295 |
| 2004/0205446 A1 * | 10/2004 | Yamagishi | 714/792 |

* cited by examiner

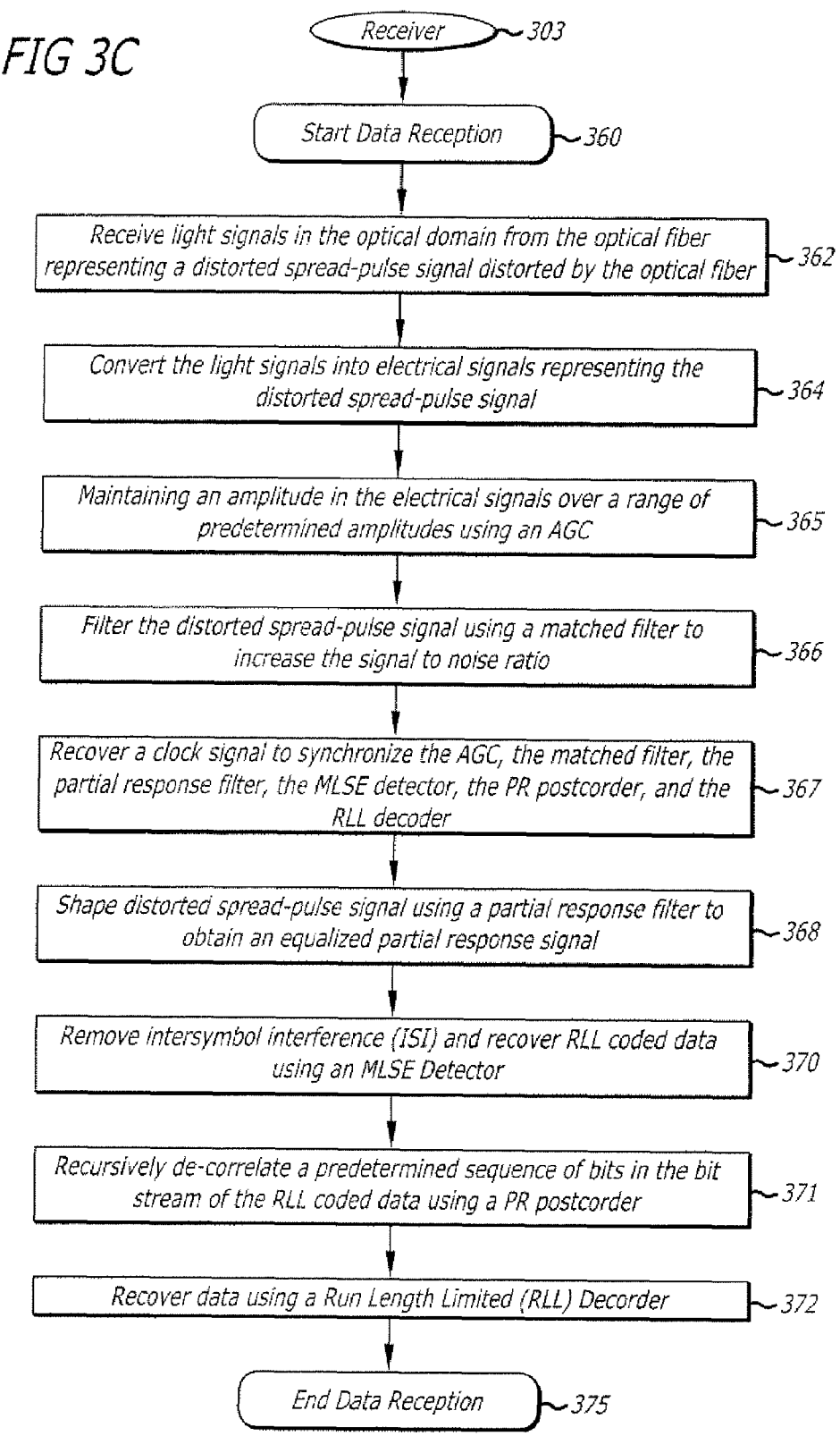

$(1+D)^2$ Trellis I/O

<u>$(1+D)^2$ Metric Update Algorithm</u>

$m_0(k) = \min \{ m_0(k-1)+2y(k)+4a, \, m_1(k-1)+y(k)+a \}$ $m_1(k) = \min \{ m_2(k-1), \, m_3(k-1)-y(k)+a \}$ $m_2(k) = \min \{ m_0(k-1)+y(k)+a, \, m_1(k-1) \}$ $m_3(k) = \min \{ m_2(k-1)-y(k)+a, \, m_3(k-1)-2y(k)+4a \}$

$(1+D)^2$ Viterbi Algorithm for $(-a,a)$ Input Symbols

| Condition (Compare) | Update (Accumulate) | Select Path |
|---|---|---|
| IF $\Delta m_{01}(k-1) < -y(k)-3a$, Then | $m_0(k) = m_0(k-1)+2y(k)+4a$ | 0 → 0 |
| else Do | $m_0(k) = m_1(k-1)+y(k)+a$ | 1 → 0 |
| IF $\Delta m_{23}(k-1) < -y(k)+a$, Then | $m_1(k) = m_2(k-1)$ | 2 → 1 |
| else Do | $m_1(k) = m_3(k-1)-y(k)+a$ | 3 → 1 |
| IF $\Delta m_{01}(k-1) < -y(k)-a$, Then | $m_2(k) = m_0(k-1)+y(k)+a$ | 0 → 2 |
| else Do | $m_2(k) = m_1(k-1)$ | 1 → 2 |
| IF $\Delta m_{23}(k-1) < -y(k)+3a$, Then | $m_3(k) = m_2(k-1)-y(k)+a$ | 2 → 3 |
| else Do | $m_3(k) = m_3(k-1)-2y(k)+4a$ | 3 → 3 |

METHODS OF SPREAD-PULSE MODULATION AND NONLINEAR TIME DOMAIN EQUALIZATION FOR FIBER OPTIC COMMUNICATION CHANNELS

FIELD

Embodiments of the invention generally relate to optical data links including wavelength division multiplexing (WDM) fiber optic transmitters, receivers and transceivers. Particularly, embodiments of the invention relate to modulating, encoding, and decoding data for communication over a fiber optic cable and other dispersive media.

GENERAL BACKGROUND

In order to lower the cost of communication, it has become desirable to increase the data rate and the number of communication channels available. This is particularly true in fiber optic communication systems.

In fiber optic communication systems, wavelength division multiplexing (WDM) has been used over the same fiber optic communication link so that multiple channels of communication may be established over one fiber optic cable. The multiple channels of communication are established at different center wavelengths of light. However, the complexity of WDM and its higher data rates makes it expensive to use in low cost applications.

In the data link between fiber optic transceivers, emphasis has been placed on improving the electro-optic elements (EOE) and the optical elements (OE) in order to provide for the increased data rates over the fiber optic cables. For example, the laser driver driving a semiconductor laser has been improved in order to maintain a wide data eye from transmitter to receiver and avoid data bit errors at high data rates. While these improvements have marginally increased the data rate, they have not alleviated the need for high capacity optical links with lower cost and simpler operation.

Additionally, the medium of the fiber optic cable used has been compensated for various optical signal impairments in order to accommodate higher data rates and reduce some types of distortion. However, current compensation techniques operating in the optical domain are bulky, expensive, and consume too much power. Moreover, they only compensate for one type of distortion at a time, such as chromatic dispersion, and ignore other types of distortions. Furthermore, adding optical signal distortion compensators along an optical cable renders the network provisioning process more complicated and significantly increases the network operational expenses. Additionally, replacing existing lower data rate engineered fiber optic cables with compensated cables to lower distortion and to support higher data rates is very expensive.

The need for improved, cost-efficient distortion-mitigating techniques is important to lower the cost of today's optical communications networks, enhance their performance, streamline and simplify their deployment and operation.

BRIEF DESCRIPTION OF THE DRAWINGS

Features and advantages of embodiments of the invention will become apparent from the following detailed description in which:

FIG. 3C is a flow chart corresponding to reception of data from the fiber optic link by the functional blocks of FIG. 3A.

FIG. 6C illustrate a chart of the conditions used to implement the equations of the metric update algorithm illustrated in FIG. 6B for the multi state trellis state diagram of FIG. 6A.

DETAILED DESCRIPTION

Figure 1A:
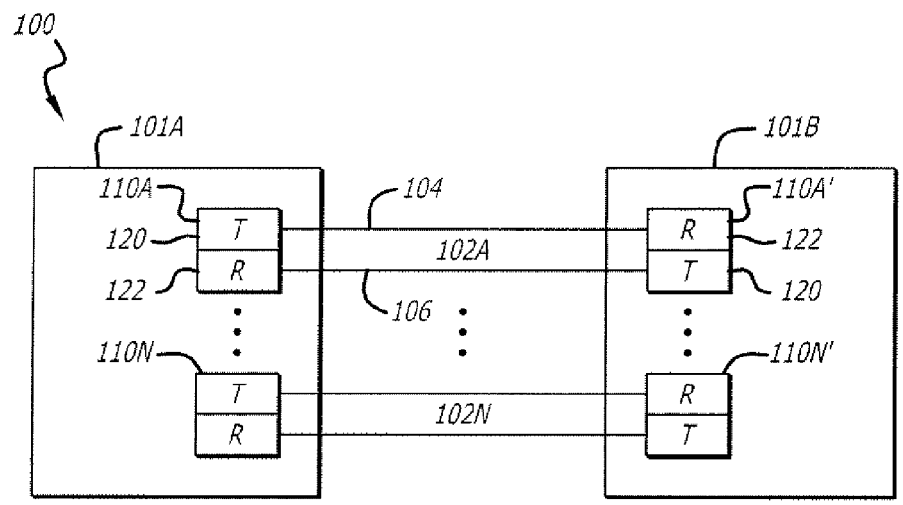
FIG. 1A is an exemplary block diagram of a first fiber optic communication system.

Embodiments of the invention set forth in the following detailed description generally relate to methods, apparatus, software, and systems for mitigating the distortions, both linear and nonlinear, that affect light pulses as they propagate in an optical fiber medium.

The embodiments of the invention use a new modulation and equalization method that operates in the time-domain to compensate a signal for orders of chromatic and polarization mode dispersive effects, which cause broadening of light pulses in an optical fiber, and combat nonlinear effects such as Raman scattering and Self Phase Modulation, and Cross Phase Modulation, in order to restore the shape of the optical pulses at a receiver.

The embodiments of the invention may be summarized by the claims. In one embodiment, a method for an optical communication channel is provided by preconditioning a data signal prior to transmission over a fiber optic cable to minimize signal distortion; converting the data signal into an optical signal and coupling the optical signal into a first end of the fiber optic cable; receiving the optical signal from a second end of the fiber optic cable opposite the first end and converting the optical signal into an electrical signal; and recovering the data signal from the electrical signal. The preconditioning of the data signal prior to transmission may include correlating bits of the data signal to minimize error propagation at a receiver and spreading out the pulses in the data signal to avoid distortion over the optical communication channel. The preconditioning of the data signal prior to transmission may further include encoding the data signal using a run length limited code to exclude undesired patterns and aid clock recovery at the receiver. The recovering of the data signal from the electrical signal may include filtering the electrical signal to optimize a signal to noise ratio, shaping the spectrum of the received electrical signal, and removing intersymbol interference (ISI) from the electrical signal. The recovering of the data signal from the electrical signal may further include maintaining an amplitude of the electrical signal over a range of predetermined amplitudes.

In another embodiment, a method for an optical communication channel is provided by encoding data into coded data using a run length limited code; correlating the coded data into a precoded signal to minimize error propagation at a receiver; spreading out the pulses in the precoded signal into a spread-pulse signal to avoid distortion over the optical communication channel; and transmitting the spread-pulse signal over the optical communication channel. The spread-pulse signal may be transmitted as light pulses over the fiber optic cable of the optical communication channel. The transmitting may include converting the spread-pulse signal from an electrical signal into an optical spread-pulse signal, and coupling the optical spread-pulse signal into a fiber optic cable to transmit the spread-pulse signal over the optical communication channel. The data may be encoded into coded data by a run length limited encoder using the run length limited code, the coded data may be correlated into the precoded signal by a precoder, and the pulses in the precoded signal may be spread out into a spread-pulse signal using a pulse filter. The method for the optical communication channel may be further provided by receiving the spread-pulse signal from the optical communication channel; filtering the spread-pulse signal to optimize a signal to noise ratio; shaping the spread-pulse'signal into an equalized partial response signal to equalize linear distortions; removing the remaining intersymbol interference (ISI) from the equalized partial response signal; and decoding the equalized partial response signal to generate received data using the run length limited code. Prior to filtering the spread-pulse signal, the method for the optical communication channel may be further provided by maintaining an amplitude of the spread-pulse signal within a predetermined range of amplitudes. The receiving may include decoupling an optical signal from the fiber optic cable to receive the spread-pulse signal over the optical communication channel; and converting the spread-pulse signal from an optical signal into an electrical signal.

In still another embodiment, a method for an optical communication channel is provided by receiving an optical spread-pulse signal from a first fiber optic cable of the optical communication system at a first receiver; converting the optical spread-pulse signal into an electrical spread-pulse signal; filtering the electrical spread-pulse signal to optimize a signal to noise ratio; shaping the electrical spread-pulse signal into an equalized partial response signal; removing the remaining intersymbol interference (ISI) from the equalized partial response signal; and decoding the equalized partial response signal to generate received data. Prior to filtering the received electrical spread-pulse signal, the method for the optical communication channel may be further provided by maintaining an amplitude of the electrical spread-pulse signal within a predetermined range of amplitudes. The amplitude of the electrical spread-pulse signal may be maintained using an automatic gain controller. The electrical spread-pulse signal may be filtered using a matched filter. The electrical spread-pulse signal may be shaped into the equalized partial response signal using a partial response filter. The intersymbol interference (ISI) may be removed from the equalized partial response signal using a maximum likelihood sequence estimation (MLSE) detector. An optical-to-electrical converter may convert the optical spread-pulse signal into the electrical spread-pulse signal. The recovered data from the MLSE may be further decoded by a run length limited decoder using a run length limited code that was used to encode the data prior to receiving. The method for the optical communication channel may be further provided by encoding transmit data into coded data using a code; correlating the coded data into a precoded signal to minimize error propagation at a second receiver; spreading out the pulses in the precoded signal into a spread-pulse transmit signal; converting the spread-pulse transmit signal into an optical spread-pulse transmit signal; and coupling the optical spread-pulse transmit signal into a second fiber optic cable of the optical communication system. The transmit data may be encoded into coded data by a run length limited encoder. The coded data may be correlated into the precoded signal by a precoder. The pulses in the precoded signal may be spread out into a spread-pulse signal using a pulse filter. The spread-pulse signal may be converted into the optical spread-pulse signal and coupled into the fiber optic cable by an electrical-to-optical converter.

Referring now to FIG. 1A, a first exemplary fiber optic communication system 100 is shown. In the fiber optic communication system 100, a first host system 101A is optically coupled to a second host system 101B by means of the optical communication channels 102A-102N. Each optical communication channel 102A-102N may be bi-directional and include a first fiber optic communication link 104 and a second fiber optic communication link 106. If unidirectional communication is only desired, one of the first or second fiber optic communication links 102,106 can suffice for the communication channel depending upon the direction of data transfer desired. Each fiber optic communication link 102,106 represents a fiber optic cable.

Wavelength division multiplexing (WDM) may be used over the each fiber optic communication link to accommodate multiple channels of communication over one fiber optic cable. Bi-directional communication may also be provided over one fiber optic communication link 102 or 106 by using different wavelengths of light within the same fiber optic cable.

Within the first host system 101A is one or more fiber optic transceiver modules 110A-110N. Similarly, in the second host system 101B are one or more fiber optic transceiver modules 110A'-110N'. Each of the fiber optic transceiver modules 110A-110N, 110A'-110N' may include a transmitter T 120 and a receiver R 122 in order to provided bi-directional communication. If unidirectional communication is desirable, a transmitter T 120 on one side and a receiver R 122 on the opposite side may be utilized instead of a transceiver having both.

Photons or light signals (e.g., data) are generated by the transmitter T 120 in the first host system 101A; transmitted through the fiber optic cable of the link 104; and received by the receiver 122 of the second host system 101B. On the other hand, transmitter T 120 of the second host system 101B can generate photons or light signals (e.g., data) and transmit them through the fiber optic cable of the link 106 120 which can then be received by the receiver R 122 of the first host system 101A. Thus, the communication system 100 can utilize photons or light signals to bi-directionally communicate data through the fiber optic cables and the respective links between the first and second host systems 101A, 101B.

Figure 1B:
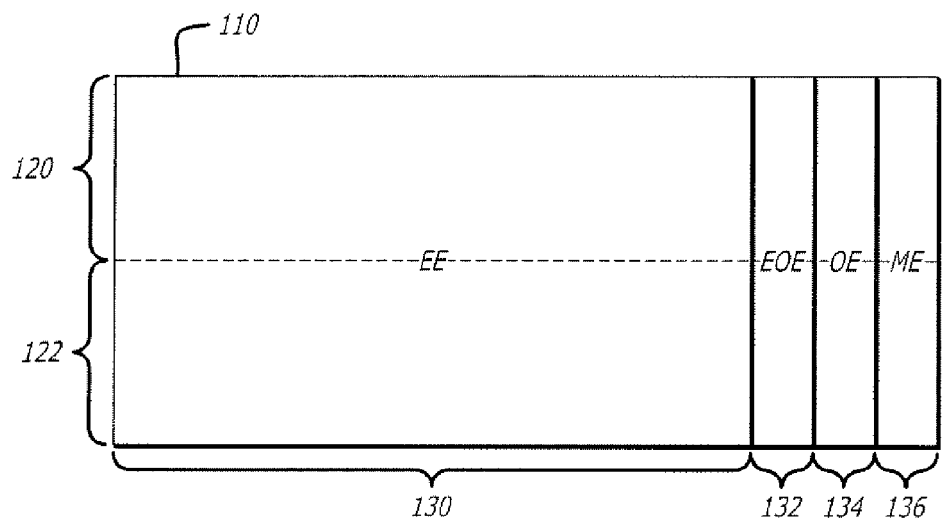
FIG. 1B is an exemplary block diagram of a fiber optic transceiver module.

Referring now to FIG. 1B, a block diagram of the basic elements found in a fiber optic transceiver 110 are illustrated. Typically, a fiber optic transceiver 110 includes an electrical element (EE) 130, an electro-optic element (EOE) 132, an optical element (OE) 134, and a mechanical element (ME) 136 which interface with each other. The transmitter, a semiconductor diode or a semiconductor laser, and the receiver, a photo-detector or photo-diode, are elements of the EOE 132 and interface with the EE 130 and the OE 134. The OE 134 typically includes one or more lenses or an optical block that includes lenses and possibly reflective or refractive surfaces, or other passive optical elements. The OE 134 couples light or photons between the fiber optic cable and the EOE 132. For example, a lens is typically used to couple light into a fiber optic cable from a semiconductor laser and a lens is typically used to decouple light from a fiber optic cable into a photodetector. The ME 136 typically includes the mechanisms used to align the fiber optic cable with the one or more lenses and the transmitter/receiver, the host electrical connector/connection (e.g., an edge connection of a printed circuit board) for the EE 130, as well as the physical packaging and any mounting or release mechanism utilized in coupling the module to the host system. In that respect, the ME 136 typically interfaces with all the elements of the typical fiber optic transceiver 110. In some cases, the elements of the fiber optic transceiver 110 may be split between elements for the transmitter 120 and elements for the receiver 122. In other cases, the elements may be blended or joined, in order to provide support for both. For example, one or more components the electrical element may provide support for both the transmitter 120 and elements for the receiver 122.

Figure 1C:
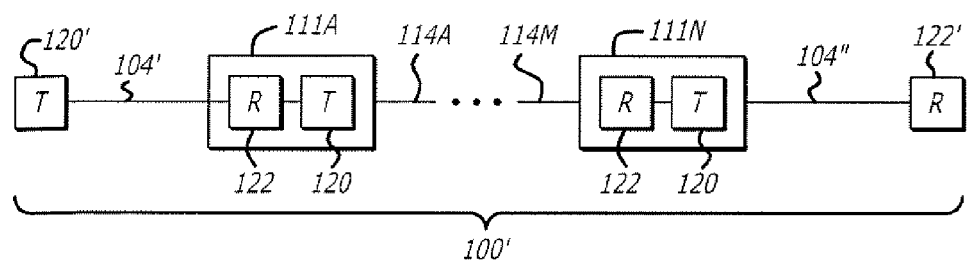
FIG. 1C is an exemplary block diagram of a second fiber optic communication system.

Referring now to FIG. 1C, a second exemplary fiber optic communication system 100' is shown. The fiber optic communication system 100' is a long haul fiber optic communications channel with one or more repeaters 111A-111N between the ends of the communications channel. From a first transmitter 120' to the first repeater 111A is a first fiber optic cable 104'. Between repeaters 111A-111N are fiber optic cables 114A-114M. Between the last repeater 111N and the last receiver 122' is another fiber optic cable 104". The lengths of the fiber optic cable 104', fiber optic cables 114A-114M, and fiber optic cable 104" are typically as large as possible in order to reduce the number of repeaters.

Each repeater 111A-111N includes a receiver 122 electrically coupled to a transmitter 120. In one embodiment, each repeater 111A-111N may be a transceiver 110 with received data from the receiver 122 coupled to the transmitter 120 for retransmission.

FIG. 1C illustrates a uni-directional channel from transmitter 120' to receiver 122'. However, the fiber optic communication system 100' can be readily expanded to support bi-directional communication be duplicating the components and flipping them into reverse order from the end with the receiver 122' to the end with the transmitter 120'.

Figure 2:
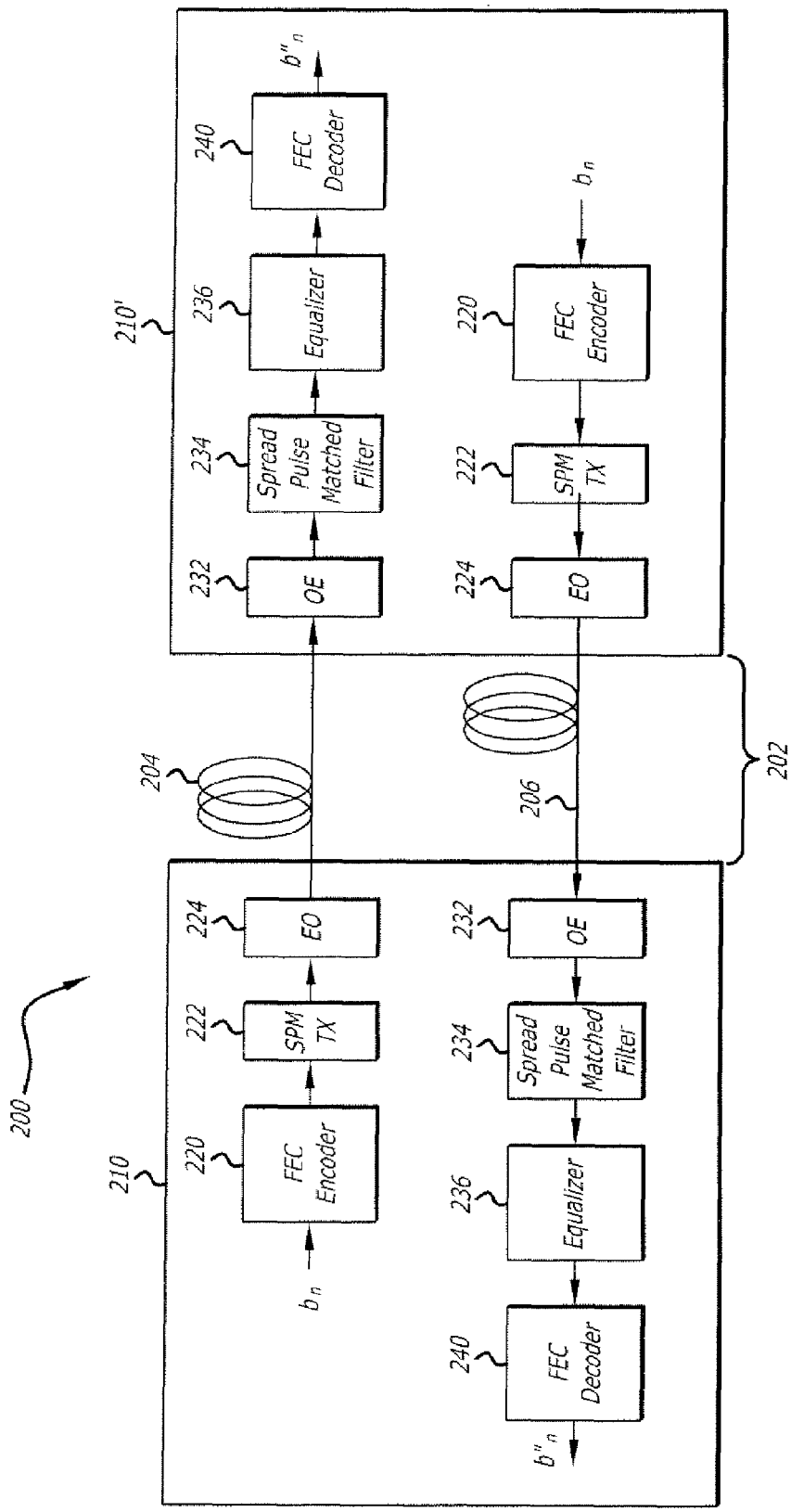
FIG. 2 is a high level block diagram of the electrical elements within fiber optic transceiver modules of an fiber optic communication system.

FIG. 2 illustrates a high level block diagram of the electrical elements within fiber optic transceiver modules of an fiber optic communication system 200, an embodiment of the present invention. The fiber optic communication system 200 has an optical communication channel 202 between a first fiber optic transceiver module 210 and a second fiber optic transceiver module 210'.

The second fiber optic transceiver module 210' is similar to the first fiber optic transceiver module 210 but couple differently to the fiber optic cables 204, 206. In the transmit data path, each fiber optic transceiver module 210,210' includes a fiber error correction (FEC) encoder 220, a pulse-shaping transmitter 222, and an electrical-optical (EO) converter 224, such as a semiconductor laser or other opto-electronic transmitter. The pulse-shaping transmitter 222 may include a spread-pulse modulator and be referred to as a spread-pulse modulation transmitter (SPM TX). In the receive data path, each fiber optic transceiver module 210, 210' includes an optical-electrical (OE) converter 232, a spread-pulse (SP) matched filter (MF) 234, an equalizer 236, and a fiber error correction (FEC) decoder 240. While data samples $b_0$ are the transmitted data samples input into the FEC encoder 220, data samples $b_0''$ out of the FEC decoder 240 are the received data samples that are recovered from the optical communication channel.

Figure 3A:
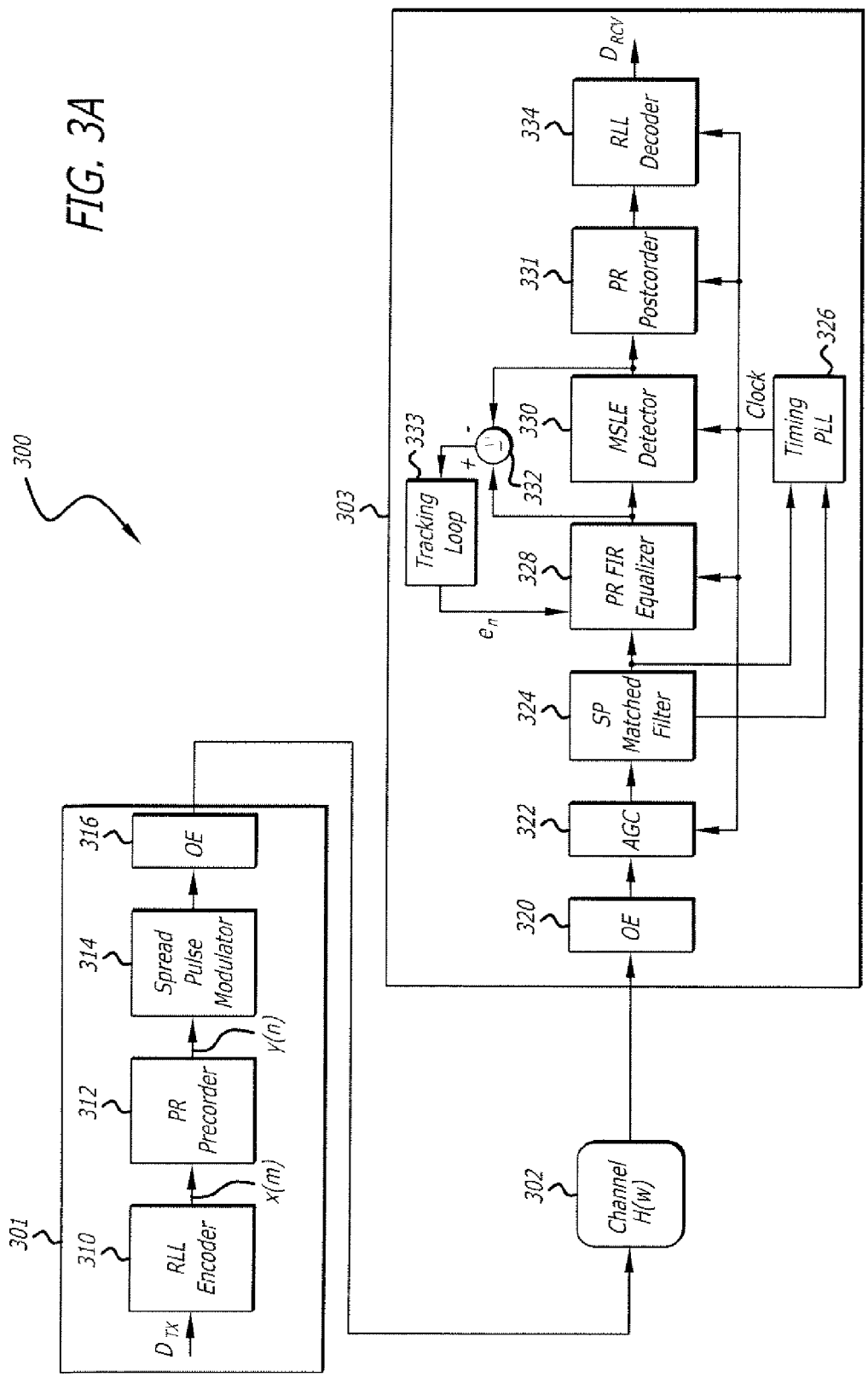
FIG. 3A is a functional block diagram of the electrical elements for communication over a fiber optic link between fiber optic transceiver modules of an fiber optic communication system.

FIG. 3A illustrates a functional block diagram of the electrical elements in a fiber optic data link between fiber optic transceiver modules of an fiber optic communication system 300. The fiber optic communication system 300 includes a transmitter 301, an optical channel 302, and a receiver 303. The transmitter 301 includes a run-length limited (RLL) encoder 310, a partial response (PR) precoder 312, a pulse filter 314, and electrical-optical (EO) converter 316 coupled together as shown. The receiver 303 includes an optical-electrical (OE) converter 320, an automatic gain control (AGC) 322, a spread-pulse (SP) matched filter 324, a timing recover phase locked loop (PLL) 326, a partial response (PR) finite impulse response (FIR) equalizer 328, a maximum likelihood sequence estimation (MLSE) detector 330, a partial response (PR) postcoder 331, a summer 332, and a run-length limited (RLL) decoder 334 coupled together as shown.

Figure 3B:
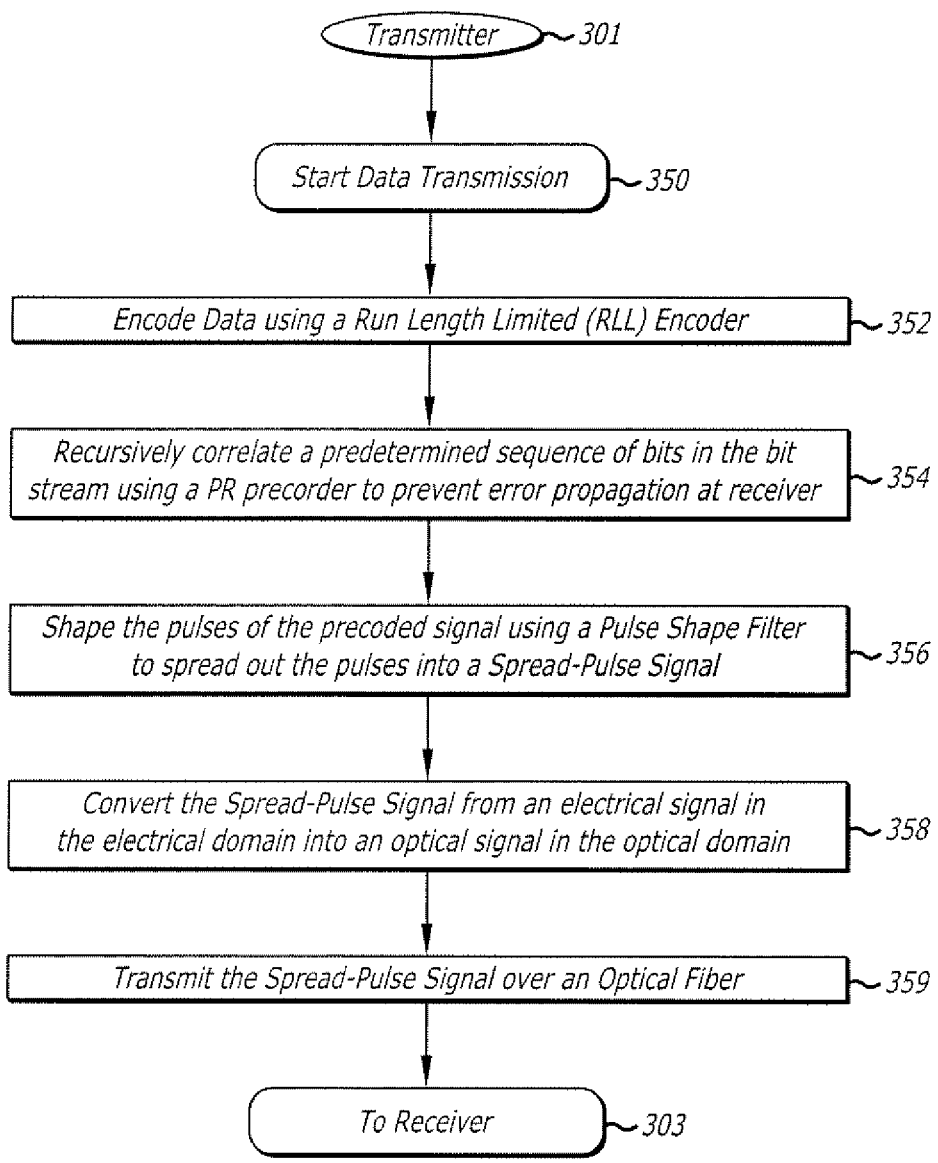
FIG. 3B is a flow chart corresponding to transmission of data over the fiber optic link by the functional blocks of FIG. 3A.

Referring now to FIGS. 3A and 3B, operation of the transmitter 301 is described upon the start of data transmission at block 350. At the transmitter 301, transmit data Dtx is coupled into a run-length limited (RLL) encoder 310 at a code rate of R=m/n (m bits of data are mapped into n-bit codeword, e.g., 64/66) chosen to fit the given constraints of the optical channel 302. The RLL encoder encodes the transmit data Dtx into RLL encoded data at block 352. The RLL encoding of the transmit data Dtx facilitates synchronization at the receiver (i.e., its self clocking), limits the effects of intersymbol interference (ISI) caused by channel dispersion in the optical channel 302, and reduces pattern-dependent penalty. The RLL code may be described by parameters d and k, the respective minimum and maximum number of zeroes between ones (e.g., modified frequency modulation (MFM) code with d=1 and k=3).

Next, the RLL encoded data output from the RLL encoder 310 is coupled into the PR precoder 312. The RLL encoded data is precoded into precode data to prevent error propagation in the receiver 303 at block 354. The precoder 312 is designed to prevent catastrophic error propagation at the receiver. The precoder 312 recursively correlates a sequence of bits of the stream of RLL encoded data so that there is a dependency between the data bits of the precoded data at the transmitter. That is, a sequence of data bits in the precoded data stream are correlated to each other. When received at the receiver, the precoding deters errors propagation during decoding. In one embodiment of the invention, the precoder may implement the equation y(n)=x(n)⊕y(n−2) for example where y(n) is the output of the precoder for sample number n, x(n) is the data input to the precoder for sample number n, y(n−2) is the output of the precoder for sample number (n−2), and the symbol⊕ represents an exclusive-or logical function. In another embodiment of the invention, the precoder may implement the equation y(n)=x(n)⊕y(n−1)⊕y(n−2), for example. It is readily obvious that other equations may be implemented to correlate bit sequences together at the precoder 312, including using more orders as well as higher orders of correlation to correlate more bits and use an exclusive-nor logical function to perform the digital bit correlation in place of the exclusive-or logical function.

Next, the precoded signal output from the precoder is coupled into the spread-pulse modulator 314. The spread-pulse modulator 314 is designed to fit a suitable pulse response (e.g., Gaussian or raised cosine). The spread-pulse modulator 314 shapes the pulses of the precoded signal to spread out the pulses into a spread-pulse signal output at block 356 and may be considered to perform spread pulse coding (SPC) or spread-pulse modulation (SPM). The pulses may be spread beyond the bit intervals prior to transmission in order that the eye is closed at the transmitter. By spreading out the pulses in the spread-pulse signal, less distortion may be added by the optical channel 302 (i.e., the channel response H(w)) during transmission. The pulse shape remains nearly unchanged during the transmission over the optical channel. By spreading out the pulses in the time-domain, (reducing the spread of pulses in the frequency domain), the bandwidth of the original signal is reduced, the dispersion length ($L_D = T_0^2 / B_2$) is increased significantly, and the dispersion effects of the optical fiber are thus substantially eliminated. Additionally, spread pulse coding (i.e., pulse spreading or spreading out pulses) is immune to non-linear distortions caused by the Kerr effect such as self-phase and cross-phase modulation and in PM-AM conversion. This immunity to nonlinear effects allows for higher launch power, and therefore higher SNR at the receiver, without any significant loss in performance. Additionally the pulse spreading allows for an exact matched filter design in the receiver that improves signal to noise ratios. Finally, due to its bandwidth-narrowing property, SPC (or SPM) allows for tighter WDM channel spacing. Current WDM system employ a 100 GHz channel separation, with this design a 25 GHz or less channel spacing is possible.

In one embodiment of the invention, the pulse-shaping filter 314 is an analog Bessel filter. In another embodiment of the invention, the pulse-shaping filter 314 is an analog raised cosine filter. The parameters of the filters (e.g., order, bandwidth) are selected to minimize the bit-error rate at the receiver. In implementation, the pulse-shaping filter 314 may be implemented in the optical domain by using a dispersive element positioned after the electrical to optical element 316 in one embodiment of the invention. In another embodiment of the invention, the pulse-shaping filter 314 is implemented in both the electrical domain and the optical domain. In another embodiment of the invention, the function of the pulse-shaping filter 314 is integrated within the EO Element 316. In yet another embodiment of the invention, the pulse-shaping filter 314 may be unused and omitted.

The signal output from the spread-pulse modulator 314, an electrical signal, is coupled into the electrical-to-optical (EO) converter 316. The electrical-to-optical (EO) converter 316 is typically a semiconductor laser with a semiconductor laser driver (direct modulation) or external modulator. The spread pulse signal is used to modulate the laser output of the semiconductor laser (i.e., the electrical-to-optical (EO) converter 316) in order to transmit data over the optical channel. Basically, the EO converter 316 converts the spread-pulse signal from an electrical signal in the electrical domain into an optical or light signal in the optical domain as indicated by block 358.

At block 359, the optical signal from the EO converter 316 is coupled into an optical fiber of the optical channel 302 to transmit the spread-pulse signal over the optical fiber from the transmitter 301 to the receiver 303. The optical or light signal of the transmitted spread-pulse signal experiences the channel response H(w) over the optical channel 302.

Referring now to FIGS. 3A and 3C, operation of the receiver 303 is described upon the start of data reception at block 360. At the receiver 303, light or optical signals in the optical domain are received from the optical fiber at block 362. These received light or optical signals represent a received spread-pulse signal. The light or optical signals are coupled into the optical-to-electrical (OE) converter 320.

Then, the optical-to-electrical (OE) converter 320 converts the light signals into electrical signals representing the received spread-pulse signal at block 364. The received spread-pulse signal, an electrical signal in the electrical domain, is coupled into the AGC 322.

The AGC 322 provides gain for low amplitude signals and attenuation for high amplitude signals to limit or maintain the signal within a known range of amplitudes and keep the power level in the signal somewhat constant as indicated by block 365. The automatic gain control enhances linearity in the system by reducing distortion and preventing saturation.

The gain-controlled signal output from the AGC 322 is coupled into the matched filter 324. The matched filter 324 may be implemented either as a digital filter or an analog filter. The matched filter 324 is designed to have a response that closely matches the combined transmitter/channel response H(w) so as to optimize the signal to noise ratio in the presence of noise. The matched filter 324 increases the signal-to-noise ratio of the receiver by filtering the received spread-pulse signal using a matched filter as indicated by block 366.

A matched filter typically has a response which maximizes the signal to noise ratio in the presence of white noise. To optimize the performance of the receiver 303, knowledge of the channel transfer function is key. The optical channel is treated as being weakly non-linear. The linear effects of the optical channel, such as dispersion and loss, dominate in the early part of a pulses journey down the optical channel. The channel non-linearities are included after the pulse disperses. The matched filter 324 is designed to fit a newly found transfer function that accurately describes the envelope of the fiber optic channel. In one embodiment of the invention, the matched filter 324 is an analog filter that is matched to the spread pulse filter 314. In which case, the transfer function used to describe the envelope of the fiber optic channel is a time domain linear solution given by equation of A(z,t) below where the square of the pulse width is much less than $B_2 z$.

$$A(z, t) \approx \frac{\tilde{A}\left(0, \frac{t}{B_2 z}\right)}{\sqrt{2\pi B_2 z}} \exp\left(-i\frac{t^2}{2B_2 z}\right)$$

where $T_0^2$ is much less than $B_2 z$.

A(z,t) is the pulse response at a distance z away from the transmitter within the channel (e.g., the fiber) at a time t. $\tilde{A}(0,t/B_2z)$ is the Fourier transform of A(0,t), the initial pulse at the transmitter (i.e., z=0) evaluated at the frequency f equal to $t/B_2z$. The matched filter 324 solves the dispersion problem in the channel (e.g., the fiber) ignoring non-linear problems. Using this response equation, the matched filter 324 can be simple, requiring no integration. The matched filter 324 is programmable based on channel properties such as distance z, dispersion factor of channel (e.g., the fiber) $B_2$, and initial pulse width $T_0$.

The output of the matched filter 324 is also coupled into the input of the timing recovery PLL 326. From the signal output of the matched filter 324, the timing recovery PLL 326 generates or recovers a clock signal as indicated by block 367 to synchronize data recovery functions together. The clock signal is coupled to the partial response (PR) finite impulse response (FIR) equalizing filter 328, the maximum likelihood sequence estimation (MLSE) detector 330, such as a Viterbi detector, the AGC 322, the PR postcoder 331, and the RLL decoder 334. In this manner the timing of the partial response (PR) finite impulse response (FIR) equalizing filter 328, the maximum likelihood sequence estimation (MLSE) detector 330, the AGC 322, the partial response postcoder 331, and the RLL decoder 334 may be synchronized together.

The output of the matched filter 324 is coupled into the input of the partial response equalizing (PR) filter 328. The PR filter 328 is an adaptive filter that can be implemented as either an analog filter, a digital filter, or a combination thereof. The partial response filter 328 shapes the spectrum of the incoming signal from the channel, the received spread-pulse signal, into that of a desired partial-response signal at block 368. That is the partial response filter 328 shapes the received spread-pulse signal into a desired target response, the partial-response signal, in order to reduce distortion by equalizing the linear distortion that may have been introduced by the channel. In one embodiment, the partial response filter 328 is adaptive finite impulse response (FIR) filter that can adapt to track variations in the channel response. The partial response filter 328 allows a controlled amount of intersymbol interference to be left in the equalized partial-response signal. This avoids zero-forcing equalization found in inverse channel equalization. The partial response filter 328 also does not suffer from noise enhancement and instability typically encountered in inverse channel equalization. Since, the partial response filter 328 is implemented as a FIR filter, it may be referred to as a linear equalizer.

Figure 4:
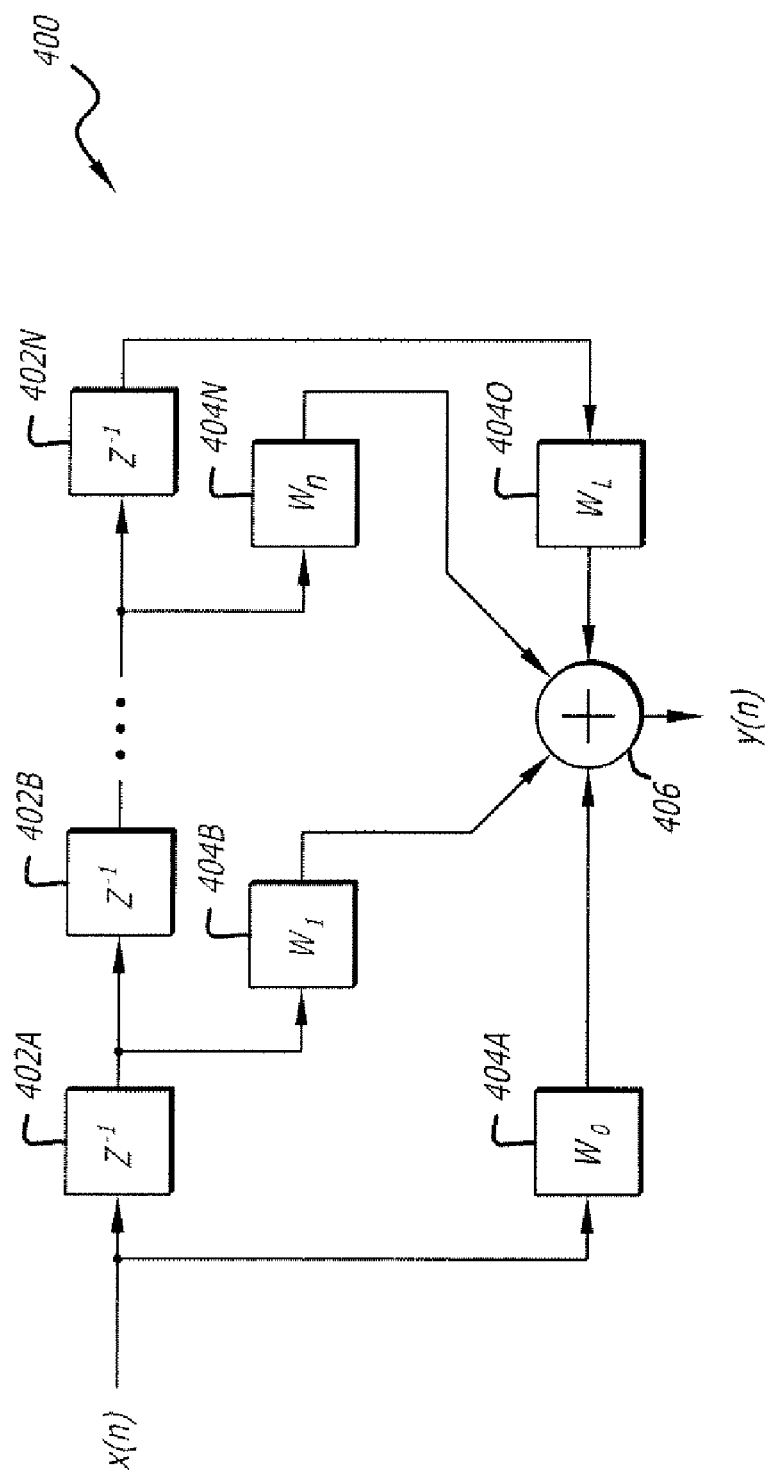
FIG. 4 is a block diagram of an adaptive finite impulse response (FIR) filter as one embodiment of the partial response filter.

Referring now to FIG. 4, an adaptive finite impulse response (FIR) filter 400 is illustrated as one embodiment of the partial response filter 328. The FIR filter 400 includes N delay elements 402A-402N, N+1 FIR filter coefficients 404A-404O, and an adder or summer 406 coupled together as illustrated. The N delay elements 402A-402N may be implemented as a register delay in the data path. The N+1 FIR filter coefficients 404A-404O are multiplied together with the respective delayed data input to generate the terms of the equation using a booth multiplier or a recursive adder, for example. The adder 406 sums the terms of the equation together to generate the output response y(n).

The adaptive FIR filter 400 implements the following equation:

$$y(n) = \sum_{k=0}^{L} W_k x(n-k)$$

The $W_k$ represents the N+1 FIR coefficients 404A-404O), the value of L is the FIR filter order less one, x(n−k) is the input, and y(n) is the output.

The partial-response signal (e.g., (1+D) partial-response signal) may be described by the following equation:

$$Y(D) = \sum_{k=0}^{k=l-1} x^k D^k$$

The order (l) and coefficients ($x_k$) in the equation of the partial-response signal are chosen to fit the constraints of a given fiber optic channel. The order (l) and coefficients ($x_k$) are typically whole numbers. If the optical channel is expected to generate severe inter-symbol interference, real-valued coefficients ($x_k$) may be used.

In one embodiment, the order is two (i.e., l=2, and $Y(D)=x_0+x_1D$) and the coefficients are set to one (i.e., $x_1=x_0=1$) such that the equation Y(D) simplifies to (1+D) and is the duobinary partial response signal. In another embodiment, the order is three (i.e., l=3, $Y(D)=x_0+x_1D+x_2D^2$) and the coefficients are set as $x_1=2$, $x_2=x_0=1$) such that the equation Y(D) simplifies to $(1+2D+D^2)$ and is the type 2 partial response signal.

Next, the equalized partial response signal (i.e., the output of the partial-response filter) is coupled to the input of the maximum likelihood sequence estimation (MLSE) detector 330 and a first input of the summer 332. In one embodiment, the MLSE detector is a Viterbi detector. As discussed previously, the PR FIR filter 328 allows some intersymbol interference (ISI) in the equalized partial response signal. That is, adjacent data transitions in the equalized partial response signal may interfere with each other. At block 370, the MLSE detector 330 removes the remaining intersymbol interference (ISI) from the equalized partial response signal to generate an MLSE data signal, corresponding to correlated RLL coded data. As the MLSE detector 330 performs a nonlinear function, it may also be referred to as a non-linear equalizer. A multi-stage process of equalization is provided by embodiments of the invention in that the PR FIR filter provides linear equalization and the MLSE detector 330 provides non-linear equalization.

Figures 5A, 5B:
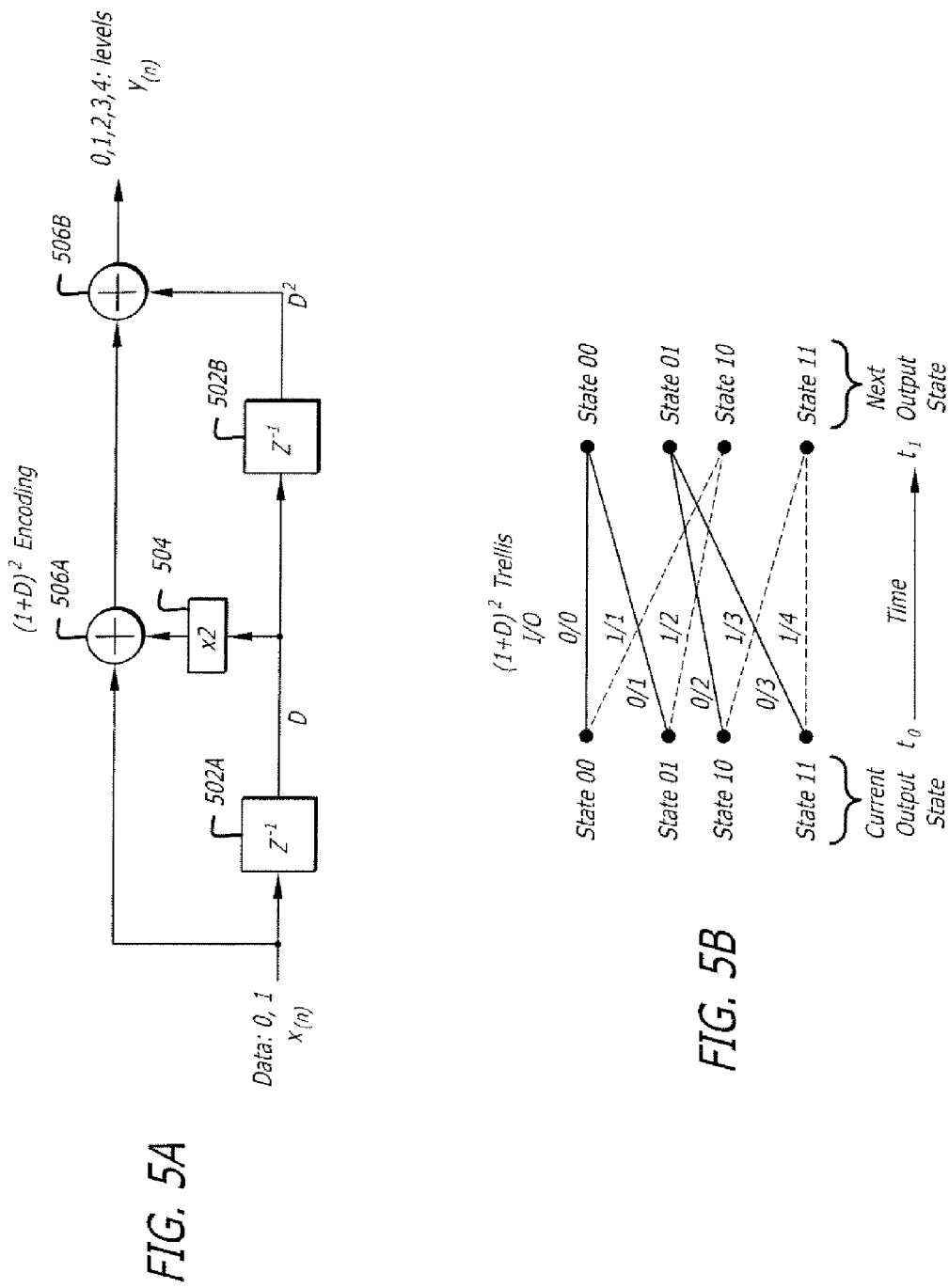
FIG. 5A is a functional block diagram of a partial response signal encoding of a second order with a data input of zero and one.
FIG. 5B is a multi state trellis state diagram in accordance with the second order partial response signal encoding of FIG. 5A.

Referring now to FIGS. 5A-5B, the operation the MLSE detector 330 with a two state data input of zero and one is now described. As discussed previously, the MLSE detector 330 is implemented as a Viterbi detector in one embodiment of the invention.

Assume that in the partial response equation Y(D) the order is two (i.e., l=3) and the coefficients are set as ($x_2=x_0=1$, $x_1=1$). In this case, the ideal partial response equation Y(D) simplifies to $(1+D)^2$ or $1+2D+D^2$. FIG. 5A illustrates a time domain functional block diagram 500 to implement the ideal partial response equation of $Y(D)=1+2D+D^2$. The functional block diagram 500 includes time delay elements 502A-502B, a doubler (×2) 504, and adders 506A-506B coupled together as shown in FIG. 5A. Assuming digital components are used, the delay elements 502A-

502B may simply be implemented as clocked D type flip flops. The doubler (×2) 504 may be implemented as a digital multiplier or a binary bit shifter. The adders 506A-506B may simply be implemented as a pair of two bit digital adders.

In implementing the ideal partial response equation of $Y(D)=1+2D+D^2$, the input sample x(n) has data bits of 0 and 1 and can generate five levels of output (0, 1, 2, 3, and 4) as the output y(n). The PR filter 328 of FIG. 3A is designed to produce a signal that is as close as possible to the ideal partial response signal Y(D). The PR filter 328 produces a version of the signal Y(D) that is corrupted with some noise and imperfections of the filter implementation. The MLSE detector 330 samples the output of the PR FIR filter 328 (i.e., the noisy version of the ideal partial response signal Y(D)) in order to recover the input data signal x(n) on each clock transition.

FIG. 5B illustrates a trellis diagram with all four possible output states for the partial response equation of $Y(D)=1+2D+D^2$ and its five levels of generated output with the input sample x(n) having data bits of 0 and 1. The four possible output states are State 00, State 01, State 10, and Stage 11. The MLSE detector 330, accumulates over N iterations (known as the memory of the MLSE) a distance metric (a measure comparing the received signal with the ideal signal) over each possible path in the trellis and selects the path that has the smallest accumulated distance. The input data signal x(n) is recovered by tracing back the optimal path (the one with the shortest distance) and its corresponding input symbols. For example, consider at time t0 that the current state is '11', an input symbol '0' at time t0 would produce the output symbol '3' and the new state '01'. If at time t0, the input symbol is '1' then the next output state and output symbol would be '11' and '4', respectively.

The MLSE detector 330, knowing the current output state at time t0 and in response to the input data x(n) and the output level y(n) at time t0, transitions to a next output state at time t1. The input data x(n) and the output level y(n) at time t0 are respectively represented in an I/O format along each line. For each current output state at time t0, there are two I/O combinations that may cause the MLSE detector to the next output state at time t1.

For example, consider at time t0 that the current output state is a state 01. I/O combinations of 0/1 or 1/2 for x(n)/y(n) respectively cause a state 00 or state 10 to be generated as the next output state at time t1. Now consider at time t0 that the current output state is a state 00, for example. I/O combinations of 0/0 or 1/1 for x(n)/y(n) respectively cause a state 00 or state 10 to be generated as the next output state at time t1. In this manner, the current output state as well as a number of weighted input samples can effect the next output state of the MLSE detector such that intersymbol interference may be eliminated from the output.

Figures 6A, 6B:
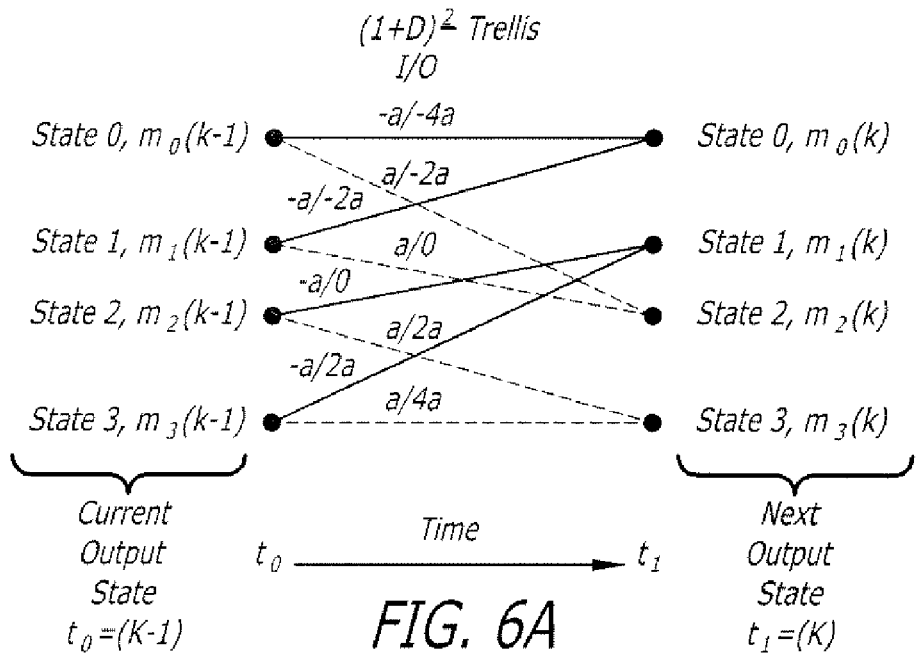
FIG. 6A is a multi state trellis state diagram for the second order partial response signal encoding of FIG. 5A with general data input symbols of positive a (+a) and negative a (−a).
FIG. 6B illustrate equations of a metric update algorithm for the multi state trellis state diagram of FIG. 6A.

Referring now to FIGS. 6A-6C, the operation the MLSE detector 330 with a general data input of positive a (+a) and negative a (−a) is now described. As discussed previously, the PR filter 328 of FIG. 3A is designed to produce a signal that is as close as possible to the ideal partial response signal $Y(D)=1+2D+D^2$. The MLSE detector 330, accumulates over N iterations (known as the memory of the MLSE) a distance metric (a measure comparing the received signal with the ideal signal) over each possible path in the trellis and selects the path that has the smallest accumulated distance. The input data signal x(n) is recovered by tracing back the optimal path (the one with the shortest distance) and its corresponding input symbols. FIG. 5A illustrates a data signal input of 0 and 1 for x(n) that is substituted for by a general data input of positive a (+a) and negative a (−a) for x(k). In implementing the ideal partial response equation in this case, an input sample x(k) has a general data input of positive a (+a) and negative a (−a) that can generate five levels of output (0, 2a, 4a, −2a, and −4a) as the output y(k) substituted for y(n) in FIG. 5A. The FIR filter is designed to produce a signal that closely resembles the ideal response y(n). The output of the FIR filter, that is y(k) corrupted with some noise, is coupled into the MLSE detector 330.

The PR filter 328 produces a version of the signal Y(D) that is corrupted with some noise due to the imperfections of the filter implementation. The MLSE detector 330 samples the output of the PR FIR filter 328 (i.e., the noisy version of the ideal partial response signal Y(D)) in order to recover the input data signal x(k) on each clock transition. The MLSE detector 330 is implemented as a Viterbi detector in one embodiment of the invention.

In FIG. 6A, a multi state trellis state diagram is illustrated for the second order partial response signal encoding of FIG. 5A with general data input symbols of positive a (+a) and negative a (−a). The current output state (state 0, 1, 2, 3) of the MLSE detector 330 is to the left of the trellis state diagram at time $t_0=(k-1)$. To the right of the trellis state diagram is the next output state (state 0, 1, 2, 3) at time $t_1=(k)$ to which the output of the MLSE Detector may change in response to the current input x(k) and the output y(k). Just to the right of each state is a metric notation $m_j(k-1)$ or $m_j(k)$. The notation $m_j(k)$ represents the value of the metric at state j and time k. The metric notation $m_j(k-1)$ or $m_j(k)$ represent equations that are used to determine the transition to the next output state from a current state. That is, given a current state j at time t=k−1 and the value of metric $m_j(k-1)$, two new metrics, corresponding to two possible transitions from state j, are computed using the newly received sample y(k). This process is repeated for each state.

In FIG. 6B, equations are illustrated of the metric update algorithm for the multi state trellis state diagram of FIG. 6A. Four equations of the metric update algorithm are provided in FIG. 6A including $m_0(k)$, $m_1(k)$, $m_2(k)$, $m_3(k)$ corresponding to the metrics of states 0, 1, 2, 3 at time k in order to determine a value for each. In each equation, y(k) denotes the received signal at time k, Min{} denotes taking the minimum of the two values in the set to be the value for the metric, and "a" is the value of the general data input. Each of these equations is evaluated at time k using the past value at time $t_0=(k-1)$ in order to determine the next output state as well as to be updated for a determination of the output state that follows after. In the equations, various threshold values are used to and added to the prior state in order to determine the current state. For example a threshold value of y(k)+a is added to $m_1(k-1)$ in the second term in the set for the equation of $m_0(k)$. As another example, a threshold value of −2y(k)+4a is added to $m_3(k-1)$ in the second term in the set for the equation of $m_3(k)$. Instead of determining a minimum value between two terms in the set, an advanced determination may be made as to which of the two values within a set will be the minimum value in order to simplify and reduce the computations of each metric. In this manner, only one of the two terms need to be computed in order to update the respective metric.

FIG. 6C illustrate a chart of the conditions used to implement the equations of the metric update algorithm illustrated in FIG. 6B for the multi state trellis state diagram of FIG. 6A. The chart illustrated in FIG. 6C makes an advanced determination as to which of the two values within a set will be the minimum value in order to simplify and reduce the computations of each metric. Three columns are illustrated in FIG. 6C. In the left column, conditions are provided in which a comparison is made with $\Delta m_{01}(k-1)$ and $\Delta m_{23}(k-1)$ against threshold values. The notation $\Delta m_{01}(k-1)$ refers to evaluating the equation of $\Delta m_{01}(k-1)=m_0(k-1)-m_1(k-1)$ and the notation $\Delta m_{23}(k-1)$ refers to evaluation the equation of $\Delta m_{23}(k-1)=m_2(k-1)-m_3(k-1)$. In the center column, equations to update the metrics $m_0(k)$, $m_1(k)$, $m_2(k)$, $m_3(k)$ at time k are provided in response to the conditions indicated in the left column. In the right column of the chart, paths to select from the current state (shown on the left) to the next state (shown on the right) are provided in response to current state and the metric values of the center column given the conditions of the left column.

In updating the metric $m_0(k)$, a determination is made whether or not $\Delta m_{01}(k-1)$ is less than the threshold value of $-y(k)-3a$. If so; then the metric $m_0(k)$ is updated using the equation $m_0(k)=m_0(k-1)+2y(k)+4a$ from the center column. If not, then the metric $m_0(k)$ is updated using the equation $m_0(k)=m_1(k-1)+y(k)+a$.

In updating the metric $m_1(k)$, a determination is made whether or not $\Delta m_{23}(k-1)$ is less than the threshold value of $-y(k)+a$. If so, then the metric $m_1(k)$ is updated using the equation $m_1(k)=m_2(k-1)$ from the center column. If not, then the metric $m_1(k)$ is updated using the equation $m_1(k)=m_3(k-1)-y(k)+a$.

In updating the metric $m_2(k)$, a determination is made whether or not $\Delta m_{01}(k-1)$ is less than the threshold value of $-y(k)-a$. If so, then the metric $m_2(k)$ is updated using the equation $m_2(k)=m_0(k-1)+y(k)+a$ from the center column. If not, then the metric $m2(k)$ is updated using the equation $m_2(k)=m_1(k-1)$.

In updating the metric $m_3(k)$, a determination is made whether or not $\Delta m_{23}(k-1)$ is less than the threshold value of $-y(k)+3a$. If so, then the metric $m_3(k)$ is updated using the equation $m_3(k)=m_2(k-1)-y(k)+a$ from the center column. If not, then the metric $m_3(k)$ is updated using the equation $m_3(k)=m_3(k-1)-2y(k)+4a$.

In selecting a path given a current state of 0, the next state is 0 if $\Delta m_{01}(k-1)$ is less than the threshold value of $-y(k)-3a$. Otherwise, the other path for the current state of 0 is selected to go to a next state of 2.

In selecting a path given a current state of 1, the next state is 0 if $\Delta m_{01}(k-1)$ is less than the threshold value of $-y(k)-3a$. Otherwise, the other path for the current state of 1 is selected to go to a next state of 2.

In selecting a path given a current state of 2, the next state is 1 if $\Delta m_{23}(k-1)$ is less than the threshold value of $-y(k)+a$. Otherwise, the other path for the current state of 2 is selected to go to a next state of 3.

In selecting a path given a current state of 3, the next state is 1 if $\Delta m_{23}(k-1)$ is less than the threshold value of $-y(k)+a$. Otherwise, the other path for the current state of 3 is selected to go to a next state of 3.

In this manner, the output of the MLSE detector may be determined and the metrics can be updated for future state determination by computing values of a few equations and performing a few comparisons against threshold values.

Referring back now to FIGS. 3A and 3C, the operation of the receiver 303 is further described. The output of the MLSE detector 330 (i.e., the MLSE data signal corresponding to correlated RLL coded data) is coupled to the input of the PR postcoder 331 (and a second input of the summer 332). The PR postcoder 331 performs the inverse function of the PR precoder 312. As discussed previously, the precoder 312 recursively correlates a sequence of bits of the stream of RLL encoded data to avoid error propagation at the receiver. That is, a sequence of data bits in the precoded data stream are correlated to each other before transmission. Thus in the receiver, the PR postcoder 331 recursively de-correlates a predetermined sequence of bits in the MLSE data signal (corresponding to correlated RLL coded data) as indicated by block 371. The number of predetermined sequence of bits being de-correlated in the receiver may match the number of the predetermined sequence of bits that were correlated in the transmitter. This removes the dependency between data bits in the data stream.

The output of the MLSE detector 330 (i.e., the MLSE data signal) is also coupled to the second input of the summer 332. The output of the summer 332 is coupled into a tracking loop circuit 333. The summer 332 functions as a substractor to compare the input and output of the MLSE detector together. The difference between the values at the input and output of the MLSE detector are coupled into the input of the tracking loop circuit 333.

The summer 332 and the tracking loop circuit 333 are in a feedback path from the MLSE detector 330 to the PR FIR filter 328. The output of the tracking loop circuit 333, an error signal $e_n$, is coupled into the PR FIR filter 328. The error signal $e_n$ is coupled to the PR FIR equalizing filter 328 to adjust the coefficients of the filter.

The tracking loop circuit 333 keeps a running tab of the error between the input and output of the MLSE detector generated by the summer 332. The error is used to adjust the coefficients of the FIR. In this manner, the FIR is able to track slow channel variations (such as due to temperature changes)

As discussed previously, the PR postcoder 331 performs the inverse function of the PR precoder 312 on the signal output from the MLSE detector 330. The de-correlated data output from the PR postcoder 331 is coupled into the input of the RLL decoder 334. The RLL decoder 334 recovers the transmitted data $D_{TX}$ from the de-correlated MLSE data signal as received data $D_{RCV}$ at block 372. The RLL decoder 334 uses the same run length limited code to decode data as was used by the RLL encoder 310 to encode data.

The RLL decoder 334 generates the received data $D_{RCV}$ at block 372 from the de-correlated MLSE data signal output generated by the PR precoder 312 which completes the discussion of the data reception at block 375. While RLL encoding and decoding is described and illustrated by the RLL encoder and RLL decoder, data may be transmitted without RLL encoding and thus may not require RLL decoding.

A the communication system spreads out the pulses using spread pulse coding in the data transmission and performs partial response equalization and maximum likelihood sequence estimation during data reception, the communication system may be referred to as a spread pulse partial response maximum likelihood (SPPRML) communication system.

According to one embodiment of the invention, the transmitter 301 and the receiver 303 may be implemented in one or more application specific integrated circuits (ASICs). In this manner, the transmitter 301 and the receiver 303 may include the functions of current dispersion compensation modules (fiber or otherwise), Polarization Mode Dispersion compensators, and clock and data recovery (CDR) circuits into an integrated circuit solution.

Figure 7A:
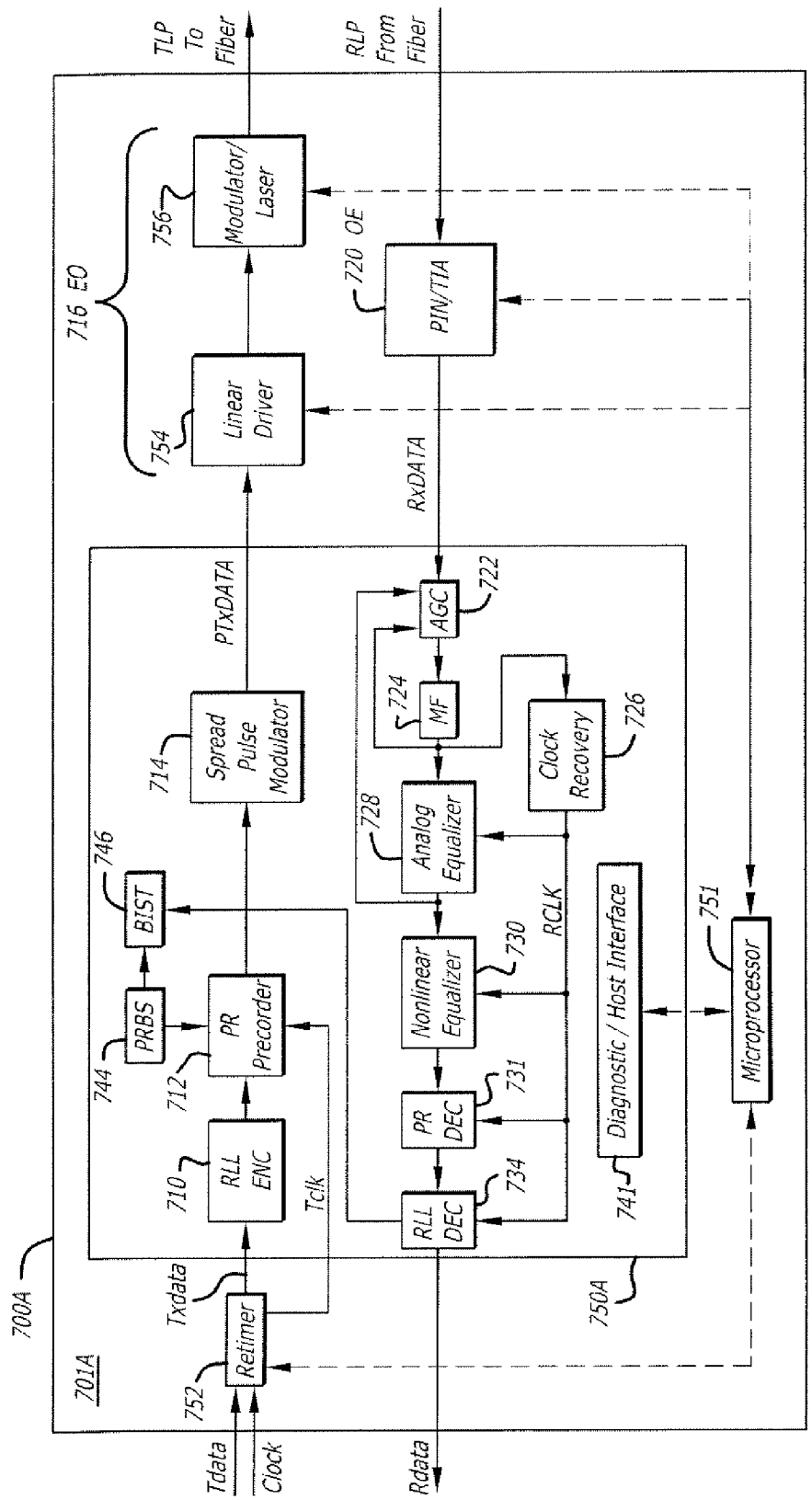
FIG. 7A is a first functional block diagram of elements within a fiber optic transceiver module.

Referring now to FIG. 7A, a first functional block diagram of elements within a fiber optic transceiver module 700A is illustrated. At the heart of the fiber optic transceiver module 700A is an application specific integrated circuit (ASIC) 750A mounted to a printed circuit board 701A. The application specific integrated circuit (ASIC) 750A implements a number of the previously described functions of the transmitter 301 and receiver 303 in circuitry on a monolithic silicon substrate. The fiber optic transceiver module 700A further includes a microprocessor 751, a retimer 752, an electrical-to-optical (EO) converter 716, and an optical-to-electrical (OE) converter 720 mounted to the printed circuit board 701A and coupled together with the ASIC 750A as shown and illustrated in FIG. 7A. The electrical-to-optical (EO) converter 716 includes a linear laser driver 754 and a directly or externally modulated semiconductor laser 756 coupled together as shown. The optical-to-electrical (OE) converter 720 includes a photodetector, such as a PIN photodiode, and a transimpedance amplifier (TIA).

On the electrical side, the fiber optic transceiver module 700A receives transmit data (Tdata) and a clock signal and outputs received data (Rdata). On the optical side, the fiber optic transceiver module 700A receives receive light pulses (RLP) from a first fiber optic cable and outputs transmit light pulses (TLP) to couple into a second fiber optic cable.

Basically, the ASIC 750A spreads the transmit data (Tx-data) and drives the optical channel by generating time-spread transmit data (PTxdata), an electrical signal which is to be converted into an optical signal (i.e., transmit light pulses (TLP)0 for transmission over the optical channel. The ASIC 750A further recovers the clock (referred to as a recovered clock, Rclk) and data (Rdata) from the received data (Rxdata), an electrical signal converted from the receive light pulses (RLP), that was processed at far-end and may have been slightly distorted by the response of the optical channel. In which case, the ASIC 750A may be referred to as a preemphasis dispersion-tolerant ASIC 750A.

In the transmit data path, the preemphasis dispersion-tolerant ASIC 750A includes a run length limited (RLL) encoder 710, a PR precoder 712, and a spread-pulse modulator 714 coupled together as shown. The RLL encoder 712, PR precoder 712, and spread-pulse modulator 714 respectively function similar to the RLL encoder 310, PR precoder 312, and spread-pulse modulator 314 as previously described with reference to FIGS. 3A and 3B.

In the receive data path, the preemphasis dispersion-tolerant transceiver ASIC 750A includes an automatic gain control (AGC) 722, a matched filter 724, a timing recover phase locked loop (PLL) 726, a partial response (PR) finite impulse response (FIR) equalizer 728 (i.e., a linear equalizer), a maximum likelihood sequence estimation (MLSE) detector 730 (i.e., an nonlinear equalizer), and a run-length limited (RLL) decoder 734 coupled together as shown in FIG. 7A. The automatic gain control (AGC) 722, matched filter 724, timing recover phase locked loop (PLL) 726, partial response (PR) finite impulse response (FIR) equalizer 728 (i.e., analog equalizer), maximum likelihood sequence estimation (MLSE) detector 730 (i.e., a nonlinear equalizer), PR postcoder 731, and run-length limited (RLL) decoder 734 respectively function similar to the automatic gain control (AGC) 322, matched filter 324, timing recover phase locked loop (PLL) 326, partial response (PR) finite impulse response. (FIR) equalizer 328, maximum likelihood sequence estimation (MLSE) detector 330, the PR postcoder 331, and the run-length limited (RLL) decoder 334 as previously described with reference to FIGS. 3A and 3C.

The preemphasis dispersion-tolerant transceiver ASIC 750A further includes a diagnostic host interface 741, a pseudo random binary sequence (PRBS) generator 744, and a built in self tester (BIST) 746 coupled together as shown in FIG. 7A. The diagnostic host interface 741 couples to the microprocessor 751 to provide diagnostic information (e.g., status) to the microprocessor as well as register access to provide the initial setup (i.e., initialization) for the preemphasis dispersion-tolerant transceiver ASIC 750A. The diagnostic host interface 741 may also be used to signal the microprocessor when an error is detected by the preemphasis dispersion-tolerant transceiver ASIC 750A.

The pseudo random binary sequence (PRBS) generator 744 and the built in self tester (BIST) 746 are used to test the communication channel from one fiber optic transceiver module to the next as well as to provide a self test of the preemphasis dispersion-tolerant transceiver ASIC 750A such as upon power up. The pseudo random binary sequence generated by the pseudo random binary sequence (PRBS) generator 744 is coupled to the precoder 712 and the BIST 746. The BIST 746 also is coupled to the RLL decoder 734 to receive the looped back test data for the purpose of comparison with the pseudo random binary sequence generated by the pseudo random binary sequence (PRBS) generator 744. If the preemphasis dispersion-tolerant transceiver ASIC 750A is to be self tested, the data is looped back before being transmitted over the channel. If the overall communication channel is to be tested, the data may be looped back at the opposite end of the communication channel.

Figure 7B:
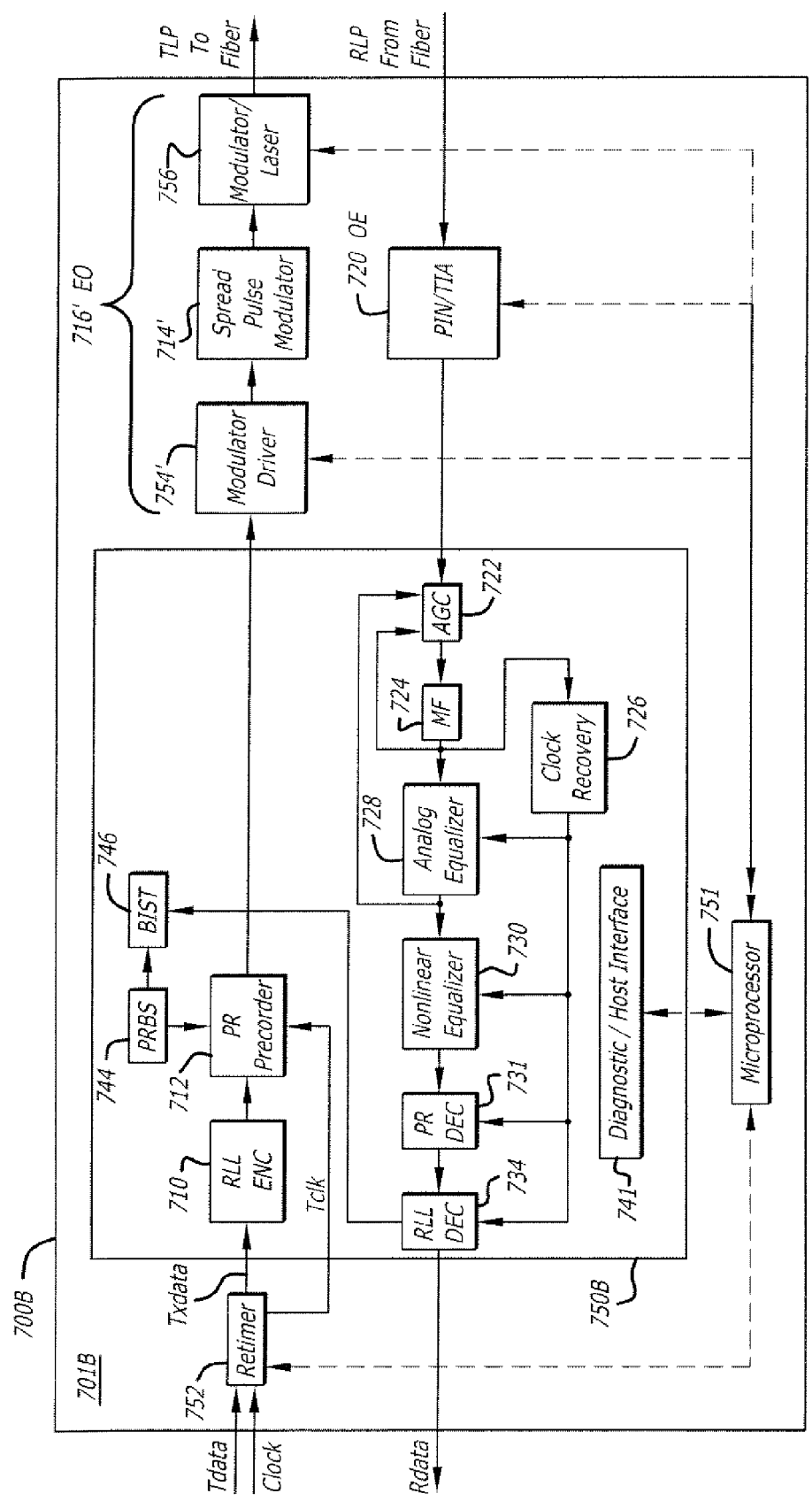
FIG. 7B is a second functional block diagram of elements within a fiber optic transceiver module.

Referring now to FIG. 7B, a second functional block diagram of elements within a fiber optic transceiver module 700B is illustrated. The fiber optic transceiver module 700B is similar to the fiber optic transceiver module 700A but for pulse shaping block 714. The spread-pulse modulator block 714 is moved out of the ASIC 750A, resulting in ASIC 750B, and instead a spread-pulse modulator 714' is mounted on the printed circuit board 701B and coupled between a laser driver 754' and the directly or externally modulated semiconductor laser 756 in the case of direct modulation or between a laser driver and an external modulator in the case of external modulation. The driver 754', spread-pulse modulator block 714', and the directly or externally modulator/semiconductor laser 756 are coupled together as shown to form an electrical-to-optical (EO) converter 716'. Thus, the preemphasis dispersion-tolerant transceiver ASIC 750B slightly differs from the preemphasis dispersion-tolerant transceiver ASIC 750A with the function of the similar blocks being described above with reference to FIG. 7A and not repeated here for reasons of brevity.

Figure 8:
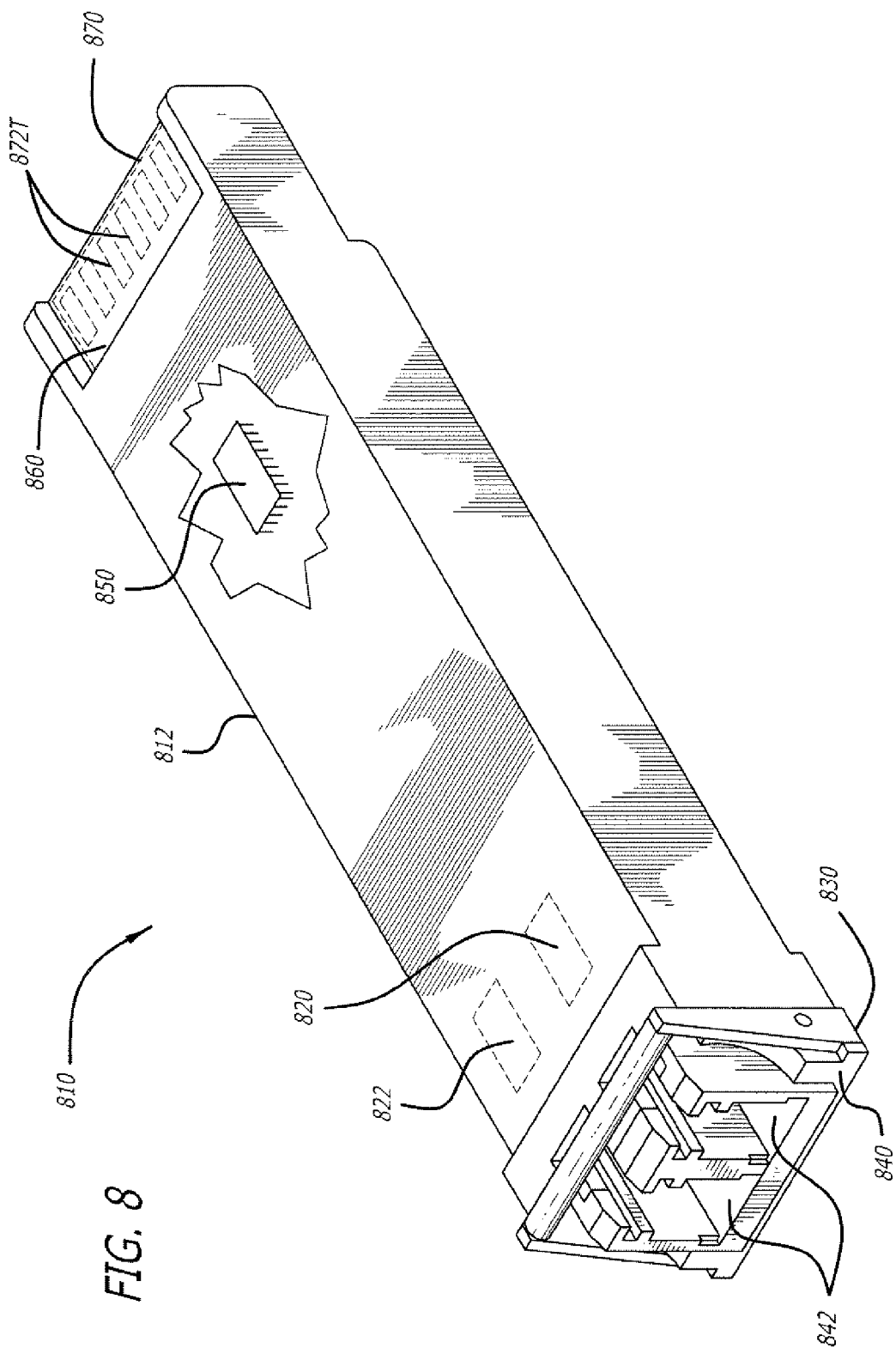
FIG. 8 is a perspective view of an exemplary fiber optical transceiver module including embodiments of the invention.

Referring now to FIG. 8, an exemplary fiber optic transceiver module 810 is illustrated. The fiber optic transceiver module 810 includes an integrated circuit 850 mounted therein to a printed circuit board 860 that incorporates embodiments of the invention. As discussed previously, the integrated circuit 850 may be one or more application specific integrated circuits (ASICs) to support both the electronics of the transmitter 301 and the receiver 303. The fiber optic transceiver module 810 further includes a light transmitter 820 (i.e., an EO converter) and a light receiver 822 (i.e., an OE converter). The fiber optic transceiver module 810 may be compatible with the 10 gigabit per second (10 GPS) small form-factor pluggable multi-source agreement (XFP), the three hundred pin multi-source agreement (MSA), XPAK, X2, XENPAC and other proprietary or standard packages.

The printed circuit board 860 includes top and bottom pads (top pads 872 illustrated) to form an edge connection 870 to couple to a socket of a host printed circuit board. A housing 812 couples around the printed circuit board 860 to protect and shield the integrated circuit 860. A front fiber optic plug receptacle 840 is provided with openings 842 to interface with one or more fiber optic cables and their plugs.

A mechanical latch/release mechanism 830 may be provided as part of the fiber optic transceiver module 810. While the fiber optic transceiver module 810 has been described has having both light transmission and light reception capability, it may be a fiber optic transmitter module with light transmission only or a fiber optic receiver module with light reception only.

Figure 9A:
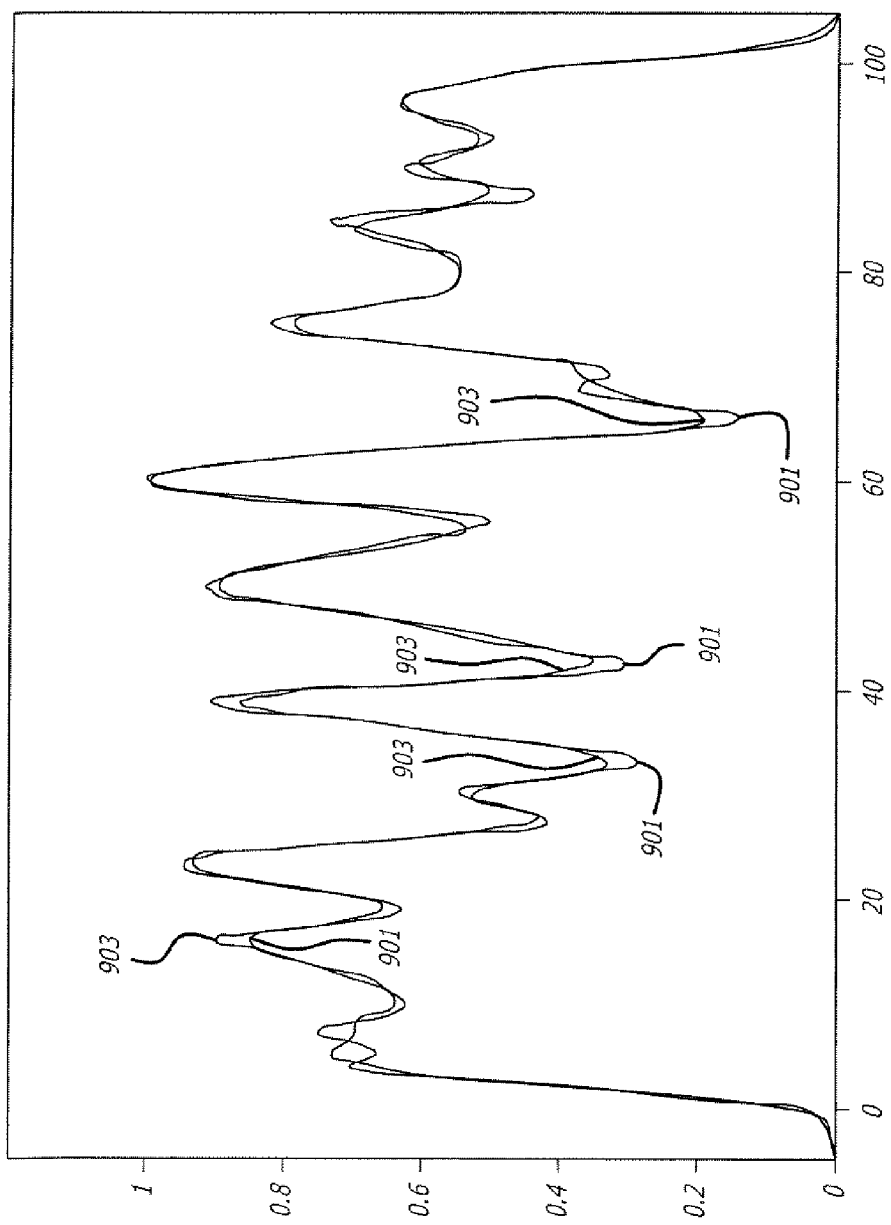
FIG. 9A is a waveform diagram of first simulation results illustrating transmit and receive signals.

Referring now to FIG. 9A, a waveform diagram of first simulation results is illustrated with the y-axis representing amplitude and the x-axis representing time or the number of data samples for the given pulse-width. In FIG. 9A, a transmit signal 901 with a pulse width of 250 picoseconds and a clock period of 100 picoseconds is launched into a 500 kilometer single mode fiber (SMF) using the embodiments of the invention. The transmit signal 901 is measured at output of the electrical-optical converter (EO) 316 illustrated in FIG. 3A. A received signal 903 is measured at the input to the optical-electrical converter (OE) 320 illustrated in FIG. 3A. With a pseudo random binary sequence (PRBS) of 100 bits in the embodiments of the invention, the received signal 903 tracks the transmit signal 901 very well such that dispersion effects are substantially reduced. That is, the optical channel 302 adds little distortion to the transmit signal 901 that is received as the receive signal 903 at the receiver 303. This is because the transmit signal 901 has been spread (preconditioned) as previously described in order to avoid the distortion of the optical channel. With little distortion from the channel, data can be readily recovered from the receive signal 903.

Figure 9B:
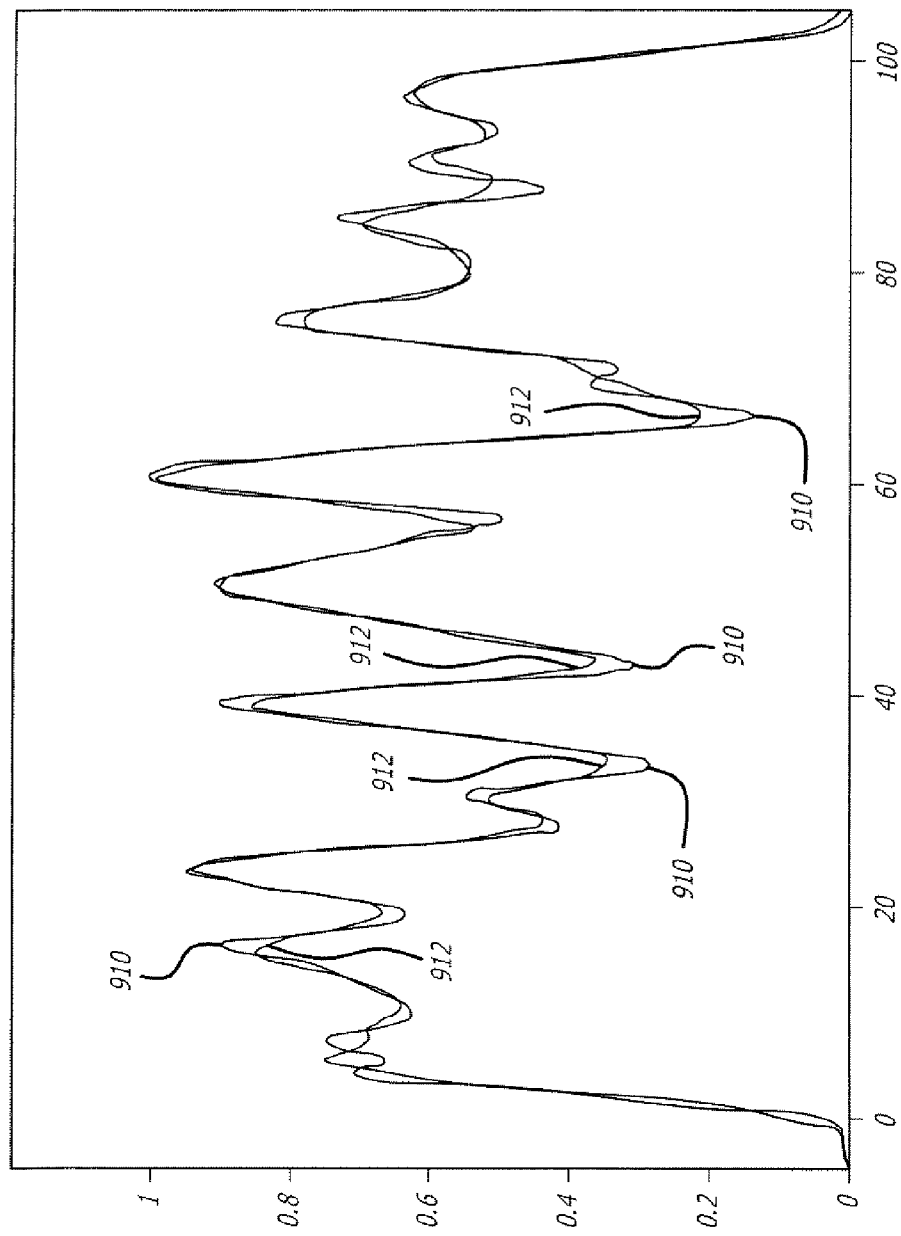
FIG. 9B is a waveform diagram of second simulation results illustrating transmit and receive signals.

Referring now to FIG. 9B, a waveform diagram of second simulation results is illustrated with the y-axis representing amplitude and the x-axis representing time or the number of data samples for the given pulse-width. In FIG. 9B, a transmit signal 910 with a pulse width of 250 picoseconds and a clock period of 100 picoseconds is launched into a 600 kilometer single mode fiber (SMF) using the embodiments of the invention. The transmit signal 910 is measured at output of the electrical-optical converter (EO) 316 illustrated in FIG. 3A. A received signal 913 is measured at the input to the optical-electrical converter (OE) 320 illustrated in FIG. 3A. With a pseudo random binary sequence (PRBS) of 100 bits, the received signal 912 using the embodiments of the invention tracks the transmit signal 910 very well such that dispersion effects are substantially reduced. Again the optical channel 302 adds little distortion to the transmit signal 910 that is received as the receive signal 913 at the receiver 303. This second simulation of FIG. 9B differs from the first simulation of FIG. 9A in that the optical fiber distance has increased by 100 kilometers, from 500 to 600 kilometers, with little added distortion. For comparison, typical lengths of fiber optic cables between repeaters without the embodiments of the invention are on the order of 40 to 80 kilometers for externally modulated lasers and less than 10 Km for direct laser modulation.

The embodiments of the invention conserve energy in optical communication systems. The embodiments of the invention employ mixed signal circuitry, a combination of analog and digital circuits, instead of pure digital circuitry. This reduces the number of active circuits over that of a pure digital circuit implementation that would require a large number of active digital logic gates. The embodiments of the invention further eliminate the need for dispersion compensating fiber (DCF) and its associated active circuitry (i.e., optical amplifiers) to further lower the overall power consumption of the transmission system. Moreover, as the length of transmission may be increased by using the embodiments of the invention, fewer repeaters may be needed to transmit data over a given path. In light of the significant number of fiber optic communication system deployed in the United States and the further increasing use of fiber optic communication systems, the embodiments of the present invention may materially reduce the amount of power consumed, the required footprint and may have an impact upon the overall electrical energy consumption used by all the fiber optic networks which are in use today.

The embodiments of the invention may be applied to a number of optical digital communications systems, including but not limited to SONET, SDH, Ethernet, metro, long haul, ultra-long haul, and submarine optical communications systems. The embodiments of the invention are applicable to all bit or data rates used in a communication system (e.g., 1 Gbps, 2.5 Gbps, 10 Gbps, and 40 Gbps) and to all types of optical fibers (e.g., Non Dispersion Shifter Fiber (NDSF), Non-Zero Dispersion Shifted Fiber (NZ-DSF, a.k.a. Lambda-Shifted Fiber), Dispersion Shifter Fiber (DSF), single mode optical fiber (SMF), and multi-mode optical fiber (MMF)). Additionally, the laser transmitter may be a cooled or non-cooled laser. Embodiments of the invention may directly modulate a direct modulated laser (DML) or indirectly modulate an external modulated laser (EML) by driving an external modulator.

While certain exemplary embodiments have been described and shown in the accompanying drawings, it is to be understood that such embodiments are merely illustrative of and not restrictive on the broad invention, and that this invention not be limited to the specific constructions and arrangements shown and described. For example, embodiments of the invention have been shown and described for use over an optical communication channel in optical communication systems. However, the embodiments of the invention may be used in other dispersive communication channels or non-optical communication channels in other communication systems. That is, the embodiments of the invention may be applied to metal wire communication systems that transmit and receive electrical signals over a metal (e.g., copper wire) without electrical-to-optical (EO) conversion and optical-to-electrical (OE) conversion.

Additionally, it will be evident that various modifications and changes may be made thereto without departing from the broader spirit and scope of the present invention as set forth in the appended claims. Therefore, the specification and drawings are accordingly to be regarded in an illustrative rather than in a restrictive sense.

What is claimed is:

1. A method for an optical communication channel, the method comprising:
   receiving a spread-pulse signal over the optical communication channel, the spread-pulse signal being formed by
      encoding data into coded data,
      correlating the coded data into a precoded signal to minimize error propagation at a receiver, and
      spreading out the pulses in the precoded signal into the spread-pulse signal to avoid distortion over the optical communication channel;
   filtering the spread-pulse signal to optimize a signal to noise ratio;
   shaping the spread-pulse signal into a partial response signal to remove linear distortion generated by the optical communication channel;
   removing further distortion and intersymbol interference (ISI) from the partial response signal to generate an equalized signal;
   de-correlating the equalized signal; and decoding the de-correlated equalized signal to generate received data.

2. The method of claim 1, wherein
the data is encoded into coded data by a run length limited encoder using run length limited code,
the coded data is correlated into the precoded signal by a precoder,
the pulses in the precoded signal are spread out into a spread-pulse signal using a spread-pulse modulator.

3. The method of claim 1 further comprises transmitting the spread pulse signal over the optical communication channel, wherein the transmitting includes,
convening the spread-pulse signal from an electrical signal into an optical spread-pulse signal, and
coupling the optical spread-pulse signal into a fiber optic cable to transmit the spread-pulse signal over the optical communication channel.

4. The method of claim 3, wherein
the spread-pulse signal is transmitted as light pulses over the fiber optic cable of the optical communication channel.

5. The method of claim 3, wherein
the data is encoded into coded data by a run length limited encoder using run length limited code,
the coded data is correlated into the precoded signal by a partial response precoder,
the pulses in the precoded signal are spread out into a spread-pulse signal using a spread-pulse modulator, and
the spread-pulse signal is converted into the optical spread-pulse signal and coupled into the fiber optic cable by a semiconductor laser transmitter.

6. The method of claim 1, wherein
the received spread-pulse signal is filtered using a matched filter;
the filtered spread-pulse signal is shaped into a partial response signal using a partial response filter;
the further distortion and intersymbol interference (ISI) are removed from the partial response signal using a maximum likelihood sequence estimation (MLSE) detector to generate the equalized signal;
the equalized signal is de-correlated by a partial response postcoder; and
the de-correlated equalized signal is decoded.

7. The method of claim 6, wherein
receiving includes
decoupling an optical signal from the fiber optic cable to receive the spread-pulse signal over the optical communication channel; and
converting the spread-pulse signal from an optical signal into an electrical signal.

8. The method of claim 7, wherein
an optical-to-electrical converter decouples the optical signal from the fiber optic cable and converts the spread-pulse signal from an optical signal into an electrical signal.

9. The method of claim 1, further comprising:
prior to filtering the spread-pulse signal,
maintaining an amplitude of the spread-pulse signal within a predetermined range of amplitudes using an automatic gain controller.

10. A method comprising:
receiving an optical spread-pulse signal from a fiber optic cable of an optical communication channel, the optical spread-pulse signal being formed by
encoding data into coded data,
correlating the coded data into a precoded signal to minimize error propagation at a receiver,
spreading out the pulses in the precoded signal into a spread-pulse signal to avoid distortion over the optical communication channel, and
converting the spread-pulse signal from an electrical signal into the optical spread-pulse signal;
converting the optical spread-pulse signal into a received electrical spread-pulse signal using an optical-to-electrical converter;
maintaining an amplitude of the electrical spread-pulse signal within a predetermined range of amplitudes using an automatic gain controller;
filtering the received electrical spread-pulse into a filtered electrical spread-pulse signal using a matched filter;
shaping the filtered electrical spread-pulse signal into a partial response signal using a partial response filter;
removing intersymbol interference (ISI) and distortion from the partial response signal to form an equalized signal using a maximum likelihood sequence estimation (MLSE) detector;
de-correlating the equalized signal into a de-correlated equalized signal using a partial response postcoder; and
decoding the de-correlated equalized signal to generate received data.

11. A method for an optical communication system, comprising:
receiving an optical spread-pulse signal from a first fiber optic cable of the optical communication system at a first receiver;
converting the optical spread-pulse signal into an electrical spread-pulse signal;
filtering the electrical spread-pulse signal to optimize a signal to noise ratio;
shaping the electrical spread-pulse signal into a partial response signal to remove linear distortion;
removing further distortion and intersymbol interference (ISI) from the partial response signal;
de-correlating the equalized signal; and
decoding the de-correlated equalized partial response signal to generate received data.

12. The method of claim 11, further comprising:
prior to filtering the electrical spread-pulse signal,
maintaining an amplitude of the electrical spread-pulse signal within a predetermined range of amplitudes.

13. The method of claim 12, wherein
the amplitude of the electrical spread-pulse signal is maintained using an automatic gain controller;
the electrical spread-pulse signal is filtered using a matched filter;
the electrical spread-pulse signal is shaped into a partial response signal using a partial response filter;
the further distortion and intersymbol interference (ISI) are removed from the partial response signal using a maximum likelihood sequence estimation (MLSE) detector; and
the equalized signal is de-correlated using a partial response postcoder; and
the de-correlated equalized signal is decoded by a run length limited decoder.

14. The method of claim 13, wherein
an optical-to-electrical converter converts the optical spread-pulse signal into the electrical spread-pulse signal.

15. The method of claim 11, wherein
the equalized signal is de-eon-elated by a partial response postcoder and then decoded by a run length limited decoder using a run length limited code that was used to encode the data prior to receiving.

16. The method of claim 11, further comprising:
at a transceiver including the first receiver and a first transmitter,
encoding transmit data into coded data using a code;
correlating the coded data into a precoded signal to minimize error propagation at a second receiver;
spreading out the pulses in the precoded signal into a spread-pulse transmit signal;
converting the spread-pulse transmit signal into an optical spread-pulse transmit signal; and
coupling the optical spread-pulse transmit signal into a second fiber optic cable of the optical communication system.

17. The method of claim 16, wherein
the code is a run length limited code.

18. The method of claim 17, wherein
the code is a run length limited code and the received data is encoded into coded data by a run length limited encoder.

19. The method of claim 16, wherein
the electrical spread-pulse signal is filtered using a matched filter;
the electrical spread-pulse signal is shaped into a partial response signal using a partial response filter;
the further distortion and intersymbol interference (ISI) are removed from the partial response signal using a maximum likelihood sequence estimation (MLSE) detector;
the equalized signal is de-correlated using a partial response postcoder; and
the de-correlated equalized partial response signal is decoded by a run length limited decoder;
the transmit data is encoded into coded data by a run length limited encoder;
the coded data is correlated into the precoded signal by a precoder;
the pulses in the precoded signal are spread out into a spread-pulse signal using a spread-pulse modulator; and
the spread-pulse signal is converted into the optical spread-pulse signal and coupled into the fiber optic cable by an electrical-to-optical converter.

20. The method of claim 11, further comprising:
at a repeater including the first receiver and a first transmitter,
encoding the received data into coded data using a code;
precoding the coded data into a precoded signal to avoid error propagation to a second receiver; spreading out the pulses in the precoded signal into a spread-pulse signal;
converting the spread-pulse signal into an optical spread-pulse signal; and
coupling the optical spread-pulse signal into a second fiber optic cable of the optical communication system.

21. A method for an optical communication channel, the method comprising:
preconditioning a data signal prior to transmission over a fiber optic cable to minimize signal distortion, the preconditioning includes (i) correlating bits of the data signal to minimize error propagation at a receiver, and (ii) spreading out pulses in the data signal to avoid distortion over the optical communication channel;
converting the data signal into an optical signal and coupling the optical signal into a first end of the fiber optic cable;
receiving the optical signal from a second end of the fiber optic cable opposite the first end and converting the optical signal into an electrical signal; and
recovering a clock and data signal from the electrical signal, the recovering of the data signal from the electrical signal includes,
filtering the electrical signal to optimize a signal to noise ratio,
shaping the electrical signal into a desired partial response signal to remove linear distortion, and
removing further distortion and intersymbol interference (ISI) from the electrical signal.

22. The method of claim 21, wherein
the bits of the data signal are correlated by a precoder,
the pulses in the data signal are spread out using a spread-pulse modulator.

23. The method of claim 21, wherein
the preconditioning of the data signal prior to transmission further includes,
encoding the data signal using a run length limited code.

24. The method of claim 23, wherein
the data signal is encoded by a run length limited encoder using the run length limited code,
the bits of the data signal are correlated by a precoder,
the pulses in the data signal are spread out using a spread-pulse modulator.

25. The method of claim 23, wherein
the recovering of the data signal from the electrical signal includes,
maintaining an amplitude of the electrical signal over a range of predetermined amplitudes,
filtering the electrical signal to optimize a signal to noise ratio,
shaping the electrical signal into a desired partial response signal to equalize linear distortions,
removing further distortion and intersymbol interference (ISI) from the electrical signal,
de-correlating the equalized signal, and
decoding the electrical signal using the run length limited code.

26. The method of claim 25, wherein
the amplitude of the electrical signal is maintained using an automatic gain controller,
the electrical signal is filtered using a matched filter,
the electrical signal is shaped using a partial response filter,
the intersymbol interference (ISI) is removed from the electrical signal using a maximum likelihood sequence estimation (MLSE) detector,
the equalized signal is de-correlated using a partial response postcoder, and
the electrical signal is decoded by a run length limited decoder using the run length limited code.

27. The method of claim 26, wherein
the data signal is encoded by a run length limited encoder using the run length limited code,
the bits of the data signal are correlated by a precoder, and
the pulses in the data signal are spread out using a spread-pulse modulator.

28. The method of claim 25, wherein
the maintaining, the filtering, the shaping, the removing, the de-correlating, and the decoding are synchronized together by the recovered clock.

29. The method of claim 21, wherein
the recovering of the data signal from the electrical signal further includes,
maintaining an amplitude of the electrical signal over a range of predetermined amplitudes.

30. The method of claim 29, wherein
the amplitude of the electrical signal is maintained using an automatic gain controller,
the electrical signal is filtered using a matched filter,
the electrical signal is shaped using a partial response filter, and
the remaining intersymbol interference (ISI) is removed from the electrical signal using a maximum likelihood sequence estimation (MLSE) detector.

* * * * *